(12) United States Patent
Masuya et al.

(10) Patent No.: US 7,715,374 B2
(45) Date of Patent: May 11, 2010

(54) REDUNDANCY GATEWAY SYSTEM

(75) Inventors: Yuzuru Masuya, Kanagawa (JP); Koichi Kihara, Chiba (JP); Koichi Yamazaki, Chiba (JP); Takashi Ishiguro, Saitama (JP); Yasuhiro Tazoi, Chiba (JP); Junji Arai, Gumma (JP); Takeshi Shimomura, Saitama (JP)

(73) Assignee: Oki Electric Industry Co. Ltd., Tokyo (JP)

( * ) Notice: Subject to any disclaimer, the term of this patent is extended or adjusted under 35 U.S.C. 154(b) by 211 days.

(21) Appl. No.: 12/000,133

(22) Filed: Dec. 10, 2007

(65) Prior Publication Data

US 2008/0151915 A1    Jun. 26, 2008

(30) Foreign Application Priority Data

Dec. 20, 2006 (JP) ............................. 2006-342458
Jul. 30, 2007 (JP) ............................. 2007-197425

(51) Int. Cl.
*H04L 12/66* (2006.01)
*H04L 12/56* (2006.01)

(52) U.S. Cl. ..................................... 370/352; 370/401
(58) Field of Classification Search ........................ None
See application file for complete search history.

(56) References Cited

U.S. PATENT DOCUMENTS 6,963,353 B1 * 11/2005 Firestone ................. 348/14.09
7,152,179 B1 * 12/2006 Critchfield ..................... 714/4
7,535,823 B1 * 5/2009 Malhotra et al. ............ 370/216
2002/0037002 A1 * 3/2002 Mizusawa et al. ........... 370/352
2003/0037337 A1 * 2/2003 Yona et al. .................... 725/95
2007/0183323 A1 * 8/2007 Hannu et al. ................ 370/230
2008/0002669 A1 * 1/2008 O'Brien et al. ............. 370/352

FOREIGN PATENT DOCUMENTS

| JP | 2005-057461 | 3/2005 |
| JP | 2006-074301 | 3/2006 |
| JP | 2006-100900 | 4/2006 |
| JP | 2007-243646 | 9/2007 |

\* cited by examiner

*Primary Examiner*—Pankaj Kumar
*Assistant Examiner*—Marcus R Smith
(74) *Attorney, Agent, or Firm*—Rabin & Berdo, P.C.

(57) ABSTRACT

A redundancy gateway system that can avoid short interruption of data communication caused by system switching in gateway units configured in a multiplex manner for a plurality of systems, and that can maintain the communication state prior to the system switching and avoid degradation of communication quality. A duplicate of a received packet is generated, thereby supplying the packet of the same content to a configuration of gateway units. For each packet, a common write pointer corresponding to identification information appended to the packet is generated. Each gateway unit writes the packet to its own jitter buffer in accordance with the common write pointer corresponding to each supplied packet, sequentially reads out the written packet from the jitter buffer, and generates a TDM signal. One of the gateway units is selectively switched and only the TDM signal generated by the one gateway unit is supplied to a TDM network.

9 Claims, 13 Drawing Sheets

REDUNDANCY GATEWAY SYSTEM

BACKGROUND OF THE INVENTION

1. Field of the Invention

The present invention relates to a redundancy gateway system that includes plural gateway units configured in a multiplex manner for plural systems and that carries out data communications such as audio data communications and video data communication between a packet network and a TDM network such as a telephone network.

2. Description of the Related Art

Generally, a gateway unit that connects a packet network and a telephone network with each other and relays audio data has a function of encoding an audio signal received from the telephone network by an encoder, then packetizing the audio data in accordance with RTP (Real-time Transport Protocol) and sending the packetized data to the packet network. Conversely, the gateway unit also has a function of decoding an audio packet received from the packet network by a decoder and then sending the decoded audio data to the telephone network. To restrain the influence of failure in the gateway unit on user's communication, the gateway unit is often has a multiple redundant configuration of duplex or more. For example, in a duplex redundant configuration in which one of two gateway units is set for an operation system and the other one is set for a standby system, if failure occurs in the operation system or if maintenance of the unit is necessary, system switching is carried out between the units in the operation system and the standby system. A method has been proposed to prevent interruption of communication in this system switching.

In the method disclosed in Japanese Patent Kokai No. 2005-57461, when switching between the operation system and the standby system is carried out, RTP/RTCP session information except for information related to the time stamp and sequence number, and connectivity information are transferred from the operation system to the standby system. Thus, the gateway unit switched to the operation system can start a decoding operation using a parameter value set for an RTP packet sent from an IP terminal as an initial value, and the operation system and the standby system can be switched without interrupting the audio.

However, the conventional technique cannot achieve the elimination of short interruption of speaking. In the disclosed method, since the time stamp value and sequence number of the RTP session information to be sent to the packet network are not taken over, occurrence of short interruption of speaking due to detection of discontinuity in the time stamp value and sequence number of the RTP packet in the receiving device cannot be avoided. Also, with respect to processing to perform audio processing of data received from the packet network and then output the audio data to the telephone network, synchronization of processing cannot be taken between the operation system and the standby system. Therefore, short interruption or duplication of speaking occurs in system switching. Moreover, since the new operation system unit starts operating with an initial state irrespective of the state of the former operation system unit, degradation of the speaking quality cannot be avoided until the new operation system restores a state equivalent to the state of the former operation system. For example, speaking may be interrupted while packets remaining in the jitter buffer of the former operation system are discarded, or a time of approximately 500 to 800 ms may be necessary in order to reach a state where echo can be properly eliminated as optimization control is reset in the echo canceller of the new operation system, and the speech during this period may not sound normal.

SUMMARY OF THE INVENTION

It is an object of the invention to provide a redundancy gateway system that can avoid, to the maximum extent, short interruption of data communication caused by system switching in gateway units configured in a multiplex manner for plural systems, and that can maintain the communication state prior to the system switching and avoid degradation of communication quality.

According to a first aspect of the invention, a redundancy gateway system includes plural gateway units configured in a multiplex manner between a packet network and a TDM network, and performs TDM conversion processing to plural packets supplied from the packet network, by the gateway units, and supplies a resulting TDM signal to the TDM network. The redundancy gateway system includes: a same packet supply unit that generates a duplicate of the packet and thus supplies packets of the same content to plural ones of the gateway units; a common write pointer generating unit that generates, for each of the packets, a common write pointer corresponding to identification information appended to the packet; and a selective supply unit that selectively switches one of the plural gateway units and supplies only a TDM signal acquired from the one gateway unit to the TDM network. Each of the plural gateway units includes at least one jitter buffer, a unit that generates a read pointer for the jitter buffer, and a jitter buffer control unit that writes, for each supplied packet, the packet into the jitter buffer in accordance with the common write pointer corresponding to the packet, and sequentially reads out a written packet from the jitter buffer in accordance with the jitter buffer read pointer and provides it for the TDM conversion processing.

According to a second aspect of the invention, a redundancy gateway system includes plural gateway units configured in a multiplex manner between plural packet networks configured in a multiplex manner and a TDM network, and performs TDM conversion processing to plural packets supplied from the packet networks, by the gateway units, and supplies a resulting TDM signal to the TDM network. The redundancy gateway system includes: a common write pointer generating unit that generates, for each of the packets, a common write pointer corresponding to identification information appended to the packet; and a selective supply unit that selectively switches one of the plural gateway units and supplies only a TDM signal acquired from the one gateway unit to the TDM network. Each of the plural gateway units includes at least one receiving buffer, at least one jitter buffer, a unit that generates a read pointer for the jitter buffer, a same packet supply unit that takes in a packet supplied only from one of the packet networks, duplicates this packet to generate a packet of a same content, and supplies it to another gateway unit different from a local gateway unit, a receiving buffer control unit that sequentially writes and reads both a packet taken in by the local gateway unit and a packet supplied from another gateway unit different from the local gateway unit into and from the receiving buffer, a valid packet supply unit that uses a packet read out first from the receiving buffer as a valid packet and discards a packet of the same content read out in duplicate as an invalid packet, thereby supplying only the valid packet to the jitter buffer, and a jitter buffer control unit that writes, for each packet supplied by the valid packet supply unit, the packet into the jitter buffer in accordance with the common write pointer corresponding to the packet, and sequentially reads out a written packet from the jitter buffer in accordance with the jitter buffer read pointer and provides it for the TDM conversion processing.

According to the redundancy gateway system of the invention, short interruption of data communication caused by system switching between gateway units configured in a multiplex manner for plural systems can be avoided to the maximum extent, and the communication state prior to the system switching can be maintained to avoid degradation of communication quality.

DETAILED DESCRIPTION OF THE INVENTION

Embodiments of the invention will be described in detail with reference to the accompanying drawings. In the embodiments, the term "pointer" refers to an address defining the position where information is held.

First Embodiment

Figure 1:
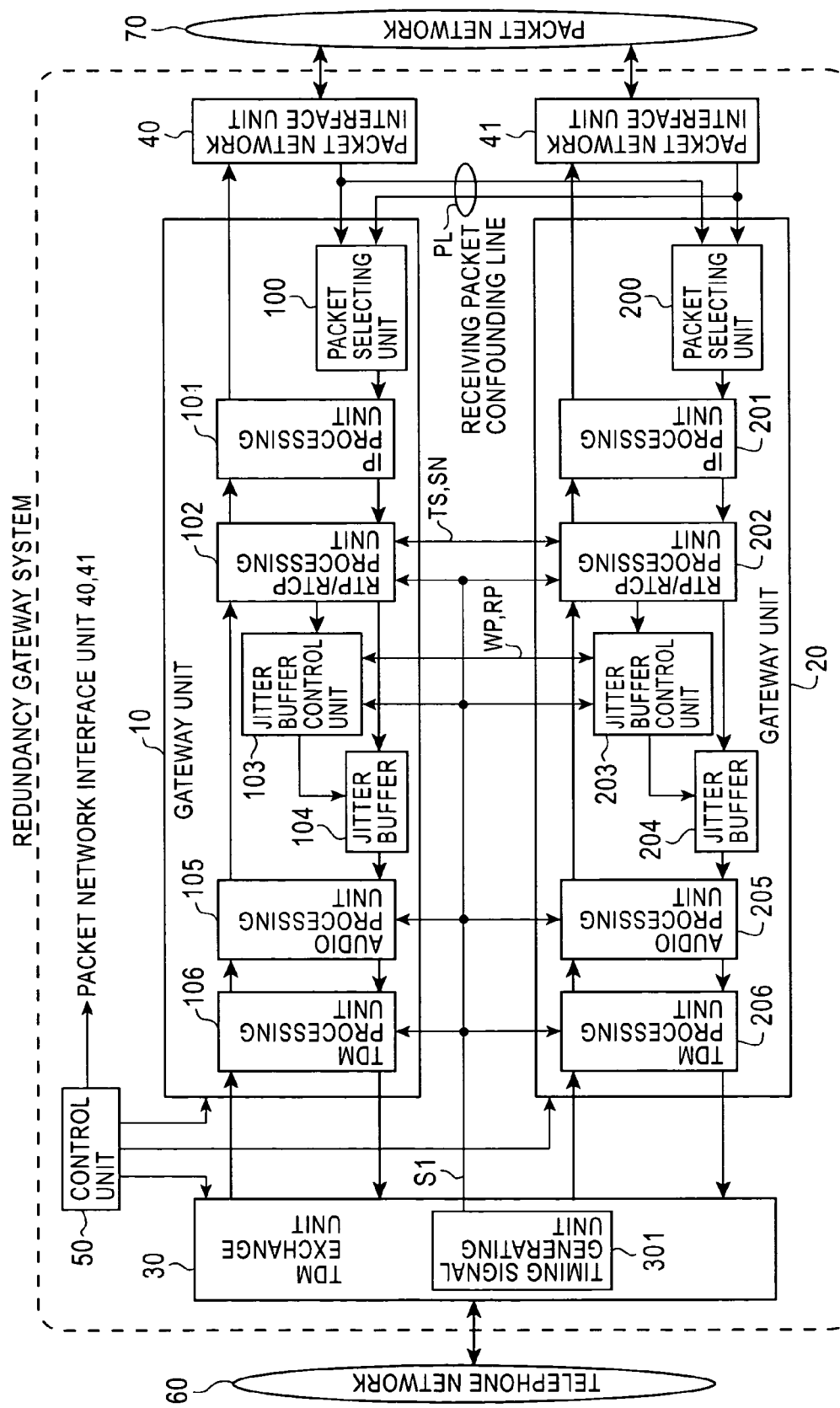
FIG. 1 is a block diagram showing an overall configuration including a redundancy gateway system according to an embodiment of the invention.

FIG. 1 shows an overall configuration including a redundancy gateway system according to an embodiment of the invention. The redundancy gateway system according to the invention is provided between a packet network 70 and a telephone network 60, which is a TDM network. The redundancy gateway system includes at least two gateway units 10 and 20 configured in a multiplex manner to form plural systems, a control unit 50, a TDM exchange unit 30, and two packet interface units 40 and 41.

The gateway unit 10 and the gateway unit 20 have the same internal configuration. The gateway unit 10 includes a packet selecting unit 100, an IP processing unit 101, an RTP/RTCP processing unit 102, a jitter buffer control unit 103, a jitter buffer 104, an audio processing unit 105, and a TDM processing unit 106. Similarly, the gateway unit 20 includes a packet selecting unit 200, an IP processing unit 201, an RTP/RTCP processing unit 202, a jitter buffer control unit 203, a jitter buffer 204, an audio processing unit 205, and a TDM processing unit 206.

Each of the packet selecting units 100 and 200 are connected to both the packet network interface units 40 and 41 via a receiving packet confounding line PL. The packet network interface units 40 and 41 have a physical address and an IP address set in advance that are necessary for connection with the packet network 70 by the control unit 50, and they are connected to the packet network 70. Since the redundant configuration is provided, only the packet network interface unit of the operation system, of the packet network interface units 40 and 41, is selectively switched to send and receive packets to and from the packet network 70.

Also, the packet network interface units 40 and 41 have a function of duplicating a received packet and output packets of the same content to both the packet selecting unit 100 and the packet selecting unit 200 connected thereto. The packet selecting units 100 and 200 select a packet from the packet network interface unit of the operation system and output it to the IP processing unit 101 and the IP processing unit 201.

Hereinafter, the internal connection in the two systems of the gateway units 10 and 20 will be described simultaneously. Therefore, in the following description, it is assumed that component elements in one gateway unit are connected to other component elements in the same gateway unit in principle, unless there is a description that "across the systems" or the like.

The IP processing unit 101 and the IP processing unit 201 are connected to the RTP/RTCP processing unit 102 and the RTP/RTCP processing unit 202, respectively. Of data in the RTP/RTCP processing unit 102 and the RTP/RTCP processing unit 202, data from the packet network 70, are supplied to the jitter buffer 104 and the jitter buffer 204. Data from the telephone network 60 are supplied thereto via the audio processing unit 105 and the audio processing unit 205, respectively. Also, the RTP/RTCP processing unit 102 and the RTP/RTCP processing unit 202 are connected to the jitter buffer control unit 103 and the jitter buffer control unit 203.

To synchronize the jitter buffer operation, the jitter buffer control unit 103 and the jitter buffer control unit 203 are connected with each other across the systems. A write pointer WP and a read pointer RP that are commonly used in the redundancy gateway system according to the invention can be supplied from one jitter buffer control unit to the other. Also, to synchronize the RTP/RTCP processing, the RTP/RTCP processing unit 102 and the RTP/RTCP processing unit 202 are connected with each other across the systems. A time stamp TS and a sequence number SN can be supplied from one RTP/RTCP processing unit to the other. In the operation in this embodiment, the write pointer WP and the read pointer RP, and the time stamp TS and the sequence number SN are supplied from the operation system gateway unit to the standby system gateway unit.

The audio processing unit 105 and the audio processing unit 205 are connected to the TDM processing unit 106 and the TDM processing unit 206, respectively. The TDM processing unit 106 and the TDM processing unit 206 are connected to the TDM exchange unit 30. The control unit 50 is connected with the gateway unit 10 and the gateway unit 20, and the TDM exchange unit 30. The TDM exchange unit 30 is connected to the telephone network 60. Also, to synchronize timing of audio processing, a timing signal generating unit 301 is connected to the TDM processing unit 106 and the TDM processing unit 206, the audio processing unit 105 and the audio processing unit 205, the jitter buffer control unit 103 and the jitter buffer control unit 203, and the RTP/RTCP processing unit 102 and the RTP/RTCP processing unit 202.

The gateway unit 10 and the gateway unit 20 form a redundant configuration. Each of them is selectively set for the operation system or for the standby system by a switch operation in accordance with a switch signal from the control unit 50. Only the gateway unit (for example, the gateway unit 10) set for the operation system is connected to the packet network 70 where IP telephone services based on the VoIP technique are provided, via the packet network interface unit. The two gateway units 10 and 20 are constantly connected with the TDM exchange unit 30 regardless of their setting for the operation system or the standby system. The TDM exchange unit 30 is connected with the ordinary telephone network 60 that transmits voice and sound in the form of TDM signals, like a public subscription telephone network.

The control unit 50 is connected with the TDM exchange unit 30, the gateway unit 10 and the gateway unit 20, and the packet network interface units 40 and 41, and has a function of controlling the operations of these units. In the case where a system switch request has occurred because of a system trouble or for maintenance, the control unit 50 sends a system switch signal by automatic processing based on an external command operation or trouble detection. Also, the control unit 50 sends out RTP session information of packetization information and the like such as RTP packet size of audio data and the like to the gateway unit 10 and the gateway unit 20 in advance and causes them to hold the information. Also, at the time of system switching, the control unit 50 sends out a system switch signal to the gateway unit 10 and the gateway unit 20 and changes their operations to the operation system or the standby system. Moreover, the control unit 50 sets a physical address and an IP address that are necessary to determine normality of a receiving packet or to assemble a transmitting packet, for the operation system or standby system gateway unit, and forms a communication-enable state with the packet network 70.

The TDM exchange unit 30 is connected with the telephone network 60 and thus terminates its network transmission system. The TDM exchange unit 30 has a function of supplying audio data extracted from a TDM signal from the telephone network 60 to both the gateway unit 10 and the gateway unit 20. The TDM exchange unit 30 includes the timing signal generating unit 301. The timing signal generating unit 301 generates a processing timing signal S1 that has a cycle equal to an integral multiple of the frame clock cycle of the TDM signal supplied from the telephone network 60 and that is common in the redundancy system. The timing signal generating unit 301 constantly supplies this processing timing signal to each unit of both the gateway unit 10 and the gateway unit 20.

Figure 2:
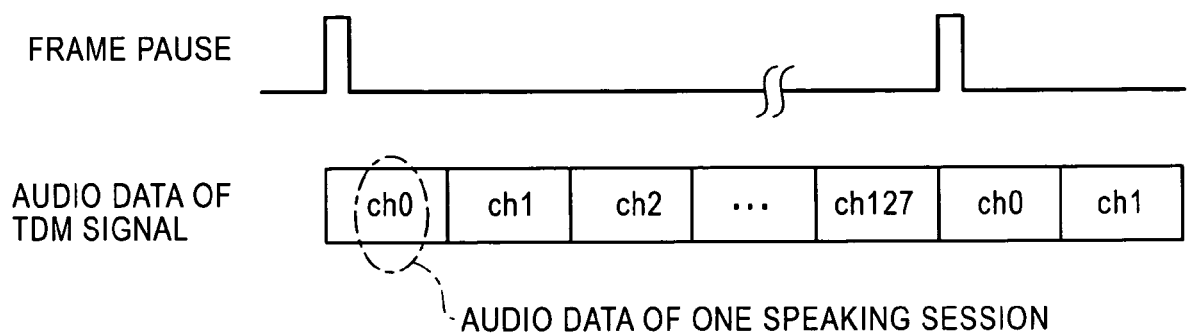
FIG. 2 is a chart showing an exemplary configuration of a TDM signal.

The TDM processing unit 106 and the TDM processing unit 206 have a function of integrating audio data of each channel from the TDM signal supplied from the TDM exchange unit 30 and outputting this audio data to the audio processing unit 105 and the audio processing unit 205 in timing based on the processing timing signal S1. The TDM signal is audio data transmitted in plural speaking sessions, as shown in FIG. 2. In this embodiment, the integration timing to integrate and packetize audio data of each channel from the TDM signal is synchronized with the timing of the frame clock (integral multiple) of the TDM signal.

The audio processing unit 105 and the audio processing unit 205 have a function of performing audio processing such as echo erasing and compression coding to the audio data from the TDM processing unit 106 and the TDM processing unit 206 and supplying the processed audio data to the RTP/RTCP processing unit 102 and the RTP/RTCP processing unit 202. The audio data is audio data integrated every cycle (for example, 10 ms) of the processing timing signal S1, for each channel. The audio processing is performed to the audio data every cycle of the processing timing signal S1, or every cycle that is equal to an integral multiple of that cycle, or every cycle divided with reference to that cycle. The audio data resulting from the audio processing is supplied in a predetermined RTP packet size to the RTP/RTCP processing unit 102 and the RTP/RTCP processing unit 202 at predetermined intervals corresponding to the size.

The RTP/RTCP processing unit 102 and the RTP/RTCP processing unit 202 have a function of packetizing the audio data supplied from the audio processing unit 105 and the audio processing unit 205 to RTP packets and supplying them to the IP processing unit 101 and the IP processing unit 201. The audio data is taken in by the RTP packet size, for each channel. The RTP/RTCP processing unit 102 and the RTP/RTCP processing unit 202 also have a function of deciding the time stamp value TS and the sequence number SN for each channel that should be set in the header part of the RTP packet, and a function of transmitting and receiving them between the RTP/RTCP processing unit of the gateway unit set for the operation system and the RTP/RTCP processing unit of the gateway unit set for the standby system. In the RTP packet resulting from packetizing, the audio data of each channel is stored in its payload part, and the time stamp value TS and the sequence number SN are stored in its header part.

The IP processing unit 101 and the IP processing unit 201 have a function of taking, as their input, the RTP packet supplied from the RTP/RTCP processing unit 102 and the RTP/RTCP processing unit 202, then generating an IP packet in accordance with the packetization information from the control unit 50, and outputting the IP packet to the packet network interface unit 40 and the packet network interface unit 41.

The two gateway units 10 and 20 are commonly supplied with the same TDM signal from the TDM exchange unit and execute processing in each unit synchronously with the processing timing signal S1 based on the TDM signal. As a result, the IP packets from the gateway unit 10 and the gateway unit 20 are perfectly the same and are sent out to the packet network 70 at substantially the same intervals. Practically, since only the gateway unit set for the operation system is in the communication-enable state with the packet network 70 via the packet network interface unit as described above, the IP packet from the gateway unit set for the operation system is transmitted to the packet network 70 and the IP packet from the gateway unit set for the standby system is discarded at the packet network interface unit connected thereto.

Figure 3:
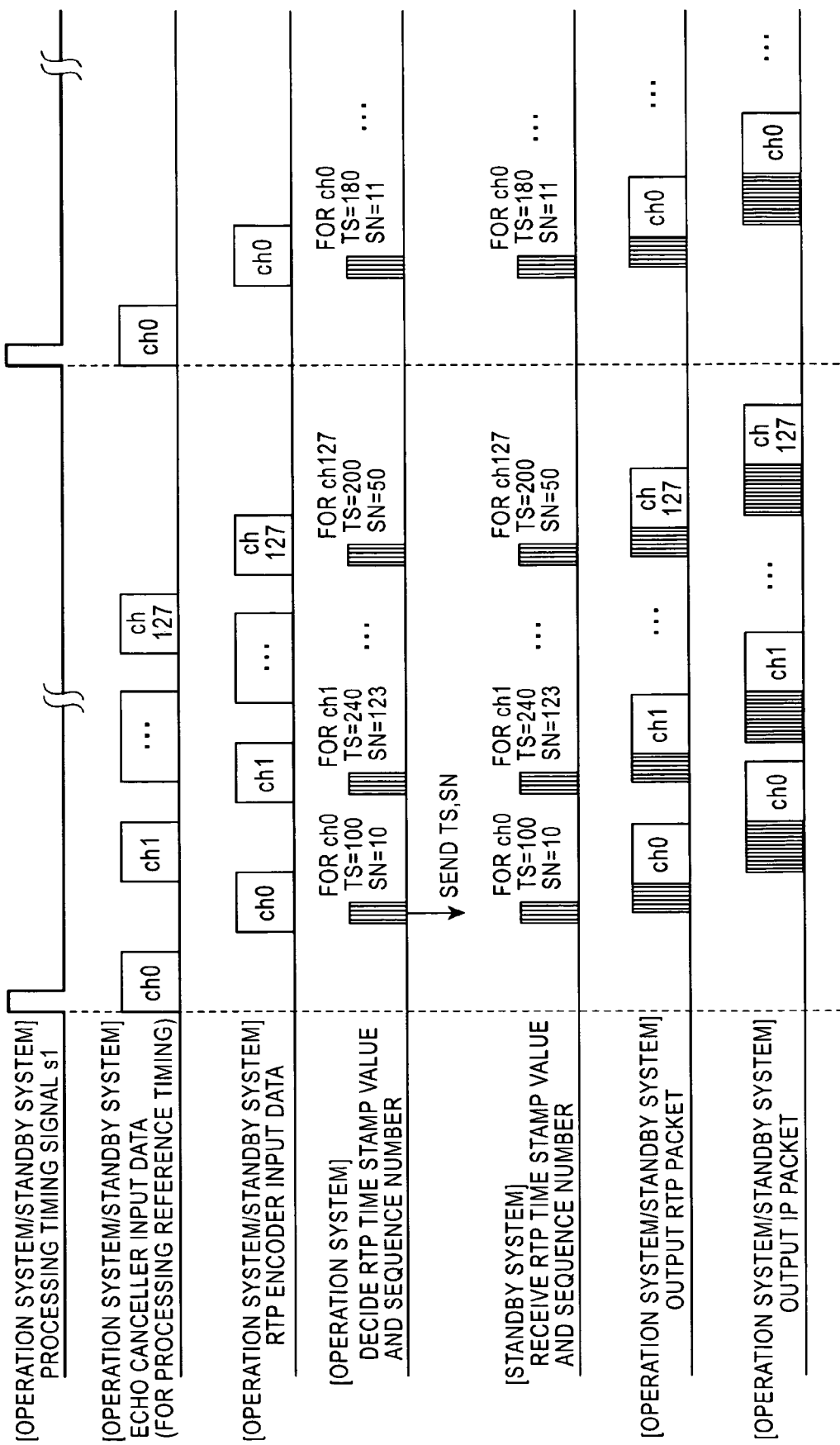
FIG. 3 is a chart showing input and output timing of audio data and a packet in two systems.

FIG. 3 shows input/output timing of audio data and packet in each of the operation system and the standby system. In FIG. 3, to make the explanation easier, it is assumed that one RTP packet and one IP packet are generated every cycle of the processing timing signal S1 in all the channels. Here, the processing timing signal S1 is supplied to both the gateway unit of the operation system and the gateway unit of the standby system. Audio data of plural channels are inputted to the audio processing units of the operation system and the standby system every clock of this processing timing signal S1. Similarly, audio data of plural channels are inputted to the RTP/RTCP processing units of the operation system and the standby system every clock of this processing timing signal S1.

In the operation system, the time stamp value TS and the sequence number SN are decided for each audio data of one channel. As shown in FIG. 3, the time stamp value TS=100 and the sequence number SN=10 are decided for the channel ch0. The time stamp value TS and the sequence number SN for each channel are sent from the RTP/RTCP processing unit of the operation system to the RTP/RTCP processing unit of the standby system. Both the RTP/RTCP processing units of the operation system and the standby system store the same time stamp value TS and sequence number SN into the RTP header, store audio data into the RTP payload part, and outputs the RTP packet. The RTP packet is IP-packetized in both the operation system and the standby system and then outputted from the IP processing units.

Outline of Operation in Packetizing

Figure 4:
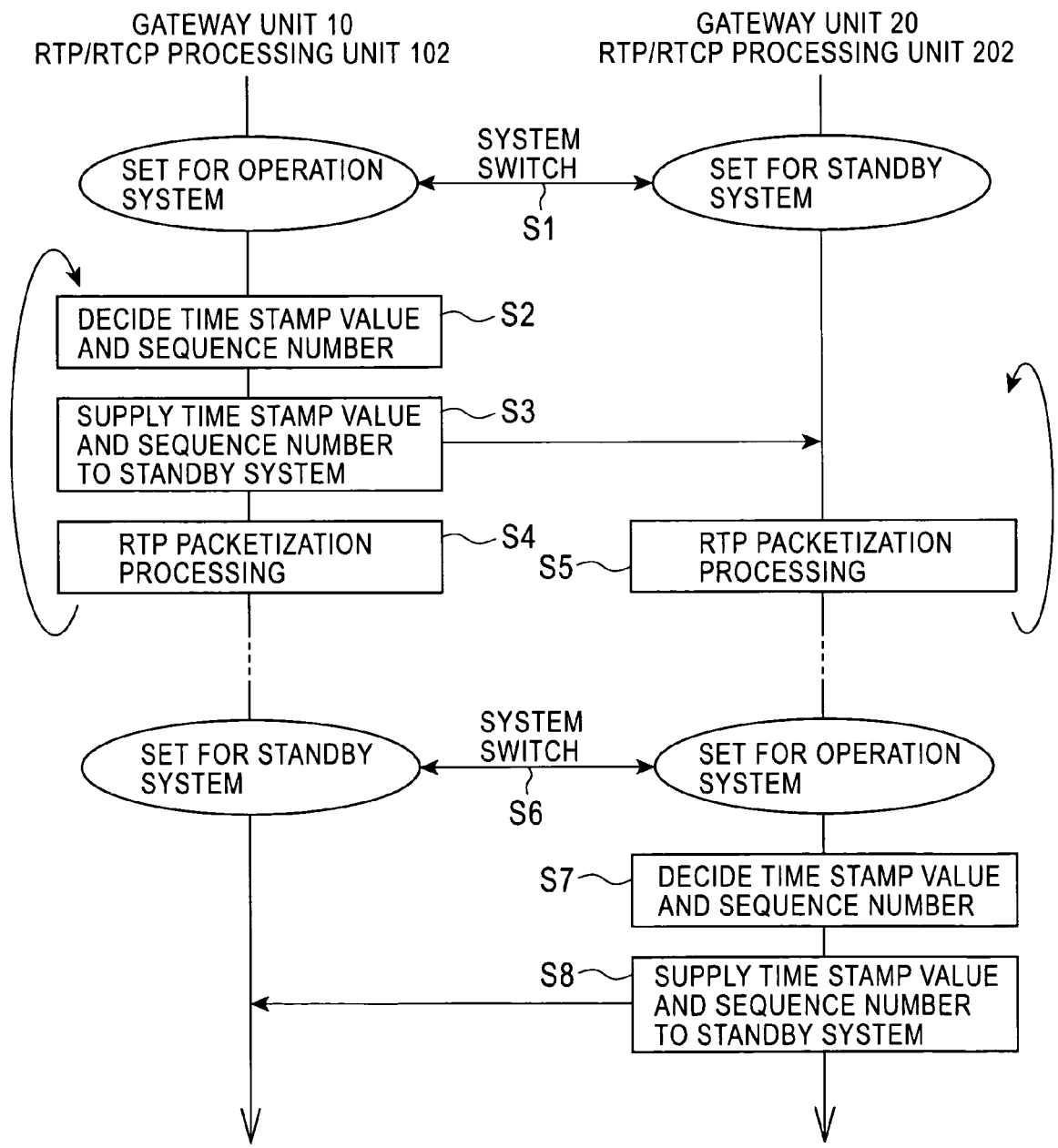
FIG. 4 is a flowchart showing an outline of an operation to packetize a TDM signal.

FIG. 4 shows an outline of operation to perform audio processing to the audio data in a TDM signal received from the telephone network 60, then packetize the audio data and output it to the packet network. Since the RTP/RTCP processing units in the two systems perform processing to exchange the time stamp value TS and the sequence number SN with each other, different operations are carried out in the operation system and the standby system.

First, system switching is executed at a certain time point. It is now assumed that the gateway unit 10 is set from the standby system to the operation system, whereas the gateway unit 20 is set from the operation system to the standby system (step S1). The RTP/RTCP processing unit 102 of the gateway unit 10 performs processing to packetize audio data supplied from the audio processing unit 105 into an RTP packet and supply it to the IP processing unit 101. In this packetization to the RTP packet, the time stamp value TS and the sequence number SN to be stored into the header part of the RTP packet are decided (step S2). The time stamp value TS and the sequence number SN are decided in such a manner that they continue from the time stamp value TS and the sequence number SN decided by the gateway unit 20, which used to be in the operation system during the period when the gateway unit 10 was set for the standby system.

Next, the RTP/RTCP processing unit 102 sends out the decided time stamp value TS and sequence number SN toward the RTP/RTCP processing unit 202 of the gateway unit 20 of the standby system, as the time stamp value TS and the sequence number SN (step S3). Then, the RTP/RTCP processing unit 102 generates an RTP packet, stores the audio data into its payload part, and stores the previously decided time stamp value TS and sequence number SN into its header part, thus performing RTP packetization processing (step S4).

Meanwhile, the RTP/RTCP processing unit 202 of the gateway unit 20 of the standby system similarly performs processing to packetize audio data supplied from the audio processing unit 205 into an RTP packet and supply it to the IP processing unit 201. At this time, in the packetization to the RTP packet, the time stamp value TS and the sequence number SN sent out from the RTP/RTCP processing unit 102 of the operation system are used as the time stamp value TS and the sequence number SN to be stored in the header part of the RTP packet. The RTP/RTCP processing unit 202 generates an RTP packet, stores the audio data into its payload part, and stores the time stamp value TS and the sequence number SN decided in the operation system, into the header part, thus performing RTP packetization processing (step S5).

The above processing in the RTP/RTCP processing unit 102 of the operation system (steps S2 to S4) and the processing in the RTP/RTCP processing unit 202 of the standby system (step S5) are repeated every time an RTP packet is generated. Since the time stamp value TS and the sequence number SN take consecutive values, the time stamp value TS and the sequence number SN need not necessarily be sent out each time from the operation system to the standby system, depending on the case.

In the case where system switching is executed again later, it is then assumed that the gateway unit 10 is set in turn from the operation system to the standby system, whereas the gateway unit 20 is set from the standby system to the operation system (step S6). The RTP/RTCP processing unit 202 of the gateway unit 20 performs processing similar to the above steps S2 to S4 (steps S7 and S8). Thus, the same packets that are perfectly synchronized with each other in the two systems can be outputted.

Outline of Operation in Forming TDM Signal

With reference to FIG. 1 again, an outline of operation to synchronize the processing in the operation system and the processing in the standby system with respect to the processing perform audio processing to the audio data in a packet received from the packet network, then form a TDM signal and output it to the telephone network will be described. In the example shown in FIG. 1, it is assumed that, of the gateway unit 10 and the gateway unit 20 forming a redundancy configuration, the gateway unit 10 is used as the operation system and the gateway unit 20 is used as the standby unit.

An arriving packet from the packet network 70 is inputted to the packet network interface unit 40. The packet network interface unit 40 outputs the inputted packet to the operation system packet selecting unit 100. The packet network interface unit 40 also duplicates the inputted packet and outputs the same packet to the standby system packet selecting unit 200 by using the receiving packet confounding line PL. For the packet network interface unit 40 and the packet network interface unit 41, system switching is not carried out at the same time as for the gateway units. An input packet from the packet network 70 is constantly outputted to both the operation system packet selecting unit 100 and the standby system packet selecting unit 200.

The IP processing unit 101 and the IP processing unit 201 select only a packet that has arrived at the local redundancy gateway system, from IP packets inputted from the packet selecting unit 100 set for the operation system and the packet selecting unit 200, and output the selected packet to the RTP/RTCP processing unit 102 and the RTP/RTCP processing unit 202. The RTP/RTCP processing unit 102 and the RTP/RTCP processing unit 202 output the time stamp and the sequence number SN of the inputted packet to the jitter buffer control unit 103 and the jitter buffer control unit 203, and output the audio data to the jitter buffer 104 and the jitter buffer 204.

In writing to the jitter buffer 104 and the jitter buffer 204, the audio data are inputted in the state where arrival fluctuation or packet replacement in the packet network has occurred. Next, in reading from the jitter buffer 104 and the jitter buffer 204, the audio data are outputted to the audio processing unit 105 and the audio processing unit 205 in timing that meets the audio processing timing based on the processing timing signal S1. The audio processing unit 105 and the audio processing unit 205 carry out audio processing such as data generation for echo erasing processing, and encoding and decoding processing, and output the audio data to the TDM processing unit 106 and the TDM processing unit 206 in timing based on the processing timing signal S1. The TDM processing unit 106 and the TDM processing unit 206 output the audio data grouped by audio processing unit timing to the TDM exchange unit 30, as time-division multiplex data using audio sampling timing as frame timing. TDM exchange unit 30 outputs the TDM signal of the operation system gateway unit, of TDM signals from the gateway unit 10 and the gateway unit 20, to the telephone network 60 in accordance with an input signal from the control unit 50. On the other hand, the TDM signal of the standby system gateway unit is discarded at the TDM exchange unit 30.

Details of Operation in Forming TDM Signal

The detailed operation of the redundancy gateway system will be described hereinafter with reference to FIG. 5 to FIG. 8. Here, the processing timing signal S1, processing timing numbers #1 to #11, and data input timing to the jitter buffer 104 and the jitter buffer 204 refer to the same timings in the cases shown in FIG. 5 to FIG. 8. It is assumed that the jitter buffer 104 and the jitter buffer 204 operate as cyclic buffers.

Figure 5:
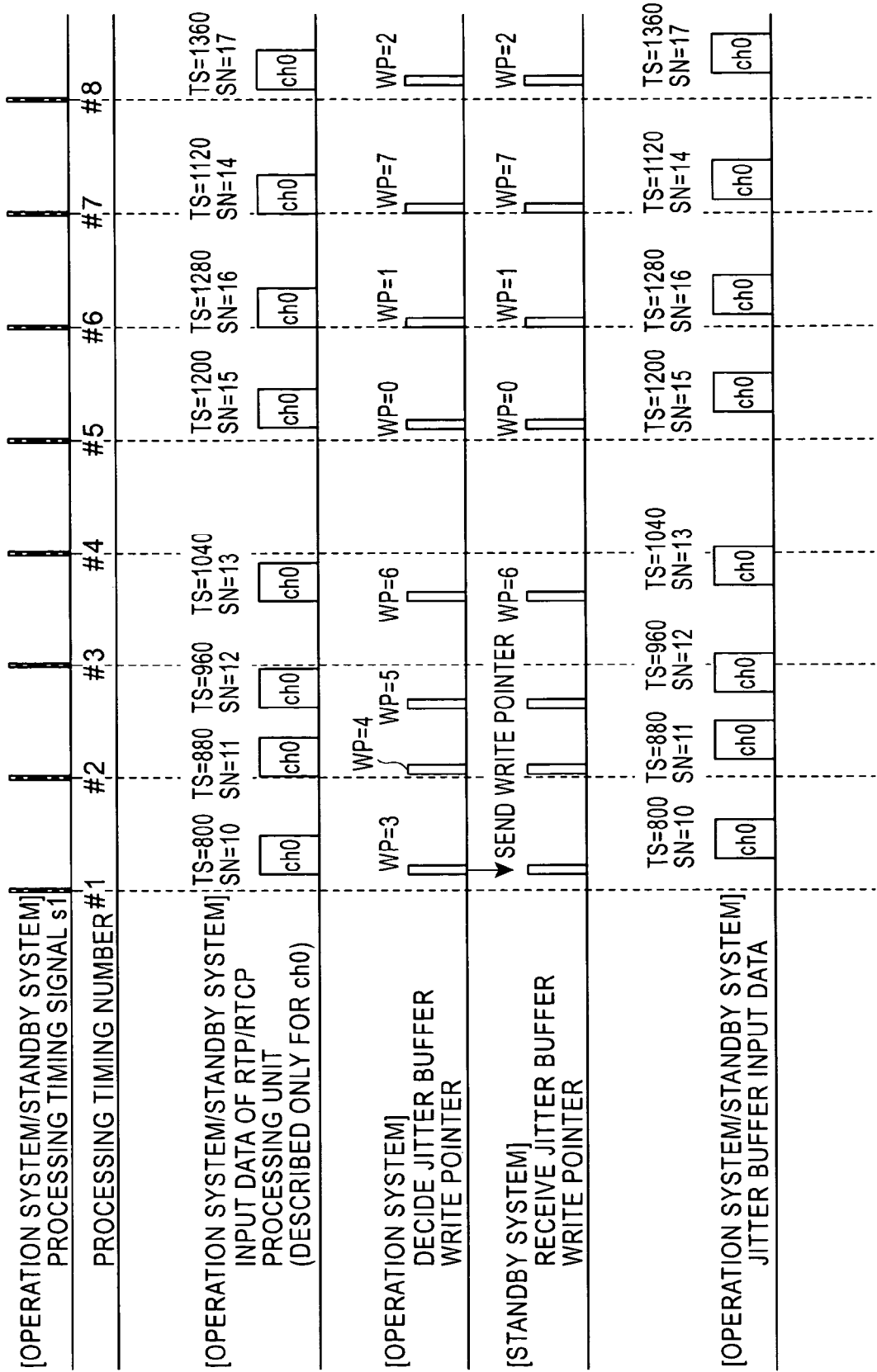
FIG. 5 is a chart showing an outline of a writing operation to a jitter buffer in two systems.

FIG. 5 shows an outline of a writing operation to the jitter buffer 104 and the jitter buffer 204. The RTP packet is inputted to the RTP/RTCP processing unit 102 and the RTP/RTCP processing unit 202 in the state where arrival fluctuation or packet replacement in the packet network has occurred, and the data is inputted to the jitter buffer 104 and the jitter buffer 204 in the similar state. The jitter buffer 104 and the jitter buffer 204 divide their memory area into each audio processing unit and append a pointer (address) to each area for management. This makes the buffer management easier at the time of reading. Hereinafter, to make the explanation easier, a case will be described where one inputted packet is one audio processing unit and the jitter buffer 104 and the jitter buffer 204 have eight areas.

The jitter buffer control unit 103 of the operation system receives the time stamp and the sequence number SN as identification information of a packet from the RTP/RTCP processing unit 102, and decides a write pointer for the operation system jitter buffer 104 in accordance with the result of comparison with the time stamp and the sequence number SN of the previously received packet identification information. Here, the write pointer is decided in such a manner that the data order in the jitter buffer becomes consecutive. This enables the pointer at the time of reading to have consecutive values and also enables easier reading control.

In the chart shown in FIG. 5, the data inputted immediately after the processing timing number #5 has a sequence number SN=15, which is not consecutive from the sequence number SN=13 of the previously inputted data. This implies that a packet has been discarded or the packet order has been replaced in the packet network 70.

In this case, on the assumption that data is written consecutively to the operation system jitter buffer 104 in the order of the sequence number SN of packets, if there is a free area in which the input data can be written, the pointer value is decided as a write pointer, leaving a writing area for the data situated between the previously inputted packet and the present packet to carry out writing. Therefore, in this case, the write pointer WP for the data inputted immediately after the processing timing number #5 is WP=0 instead of WP=7, which is acquired by adding 1 to the write pointer WP=6 for the previously inputted data. Thus, the pointer value is decided leaving the area of WP=7 as a writing area of SN=14. The data that is inputted next has SN=16 and WP=1. The subsequently inputted data has SN=14. In this case, it is determined that the input packet can be written if it is not a packet with timing after being read from the operation system jitter buffer 104. The write pointer is decided to WP=7 and then writing is carried out.

As a result of the above operation, the data are written into the jitter buffer 104 with consecutive data order. The write pointer decided in the operation system is transferred to the standby system at the same time, and it is decided as the write pointer for the standby system jitter buffer 204. As the write pointer is thus transferred from the operation system to the standby system, the data writing state of the operation system jitter buffer 104 and the data writing state of the standby system jitter buffer 204 can be made perfectly coincident with each other.

Figure 6:
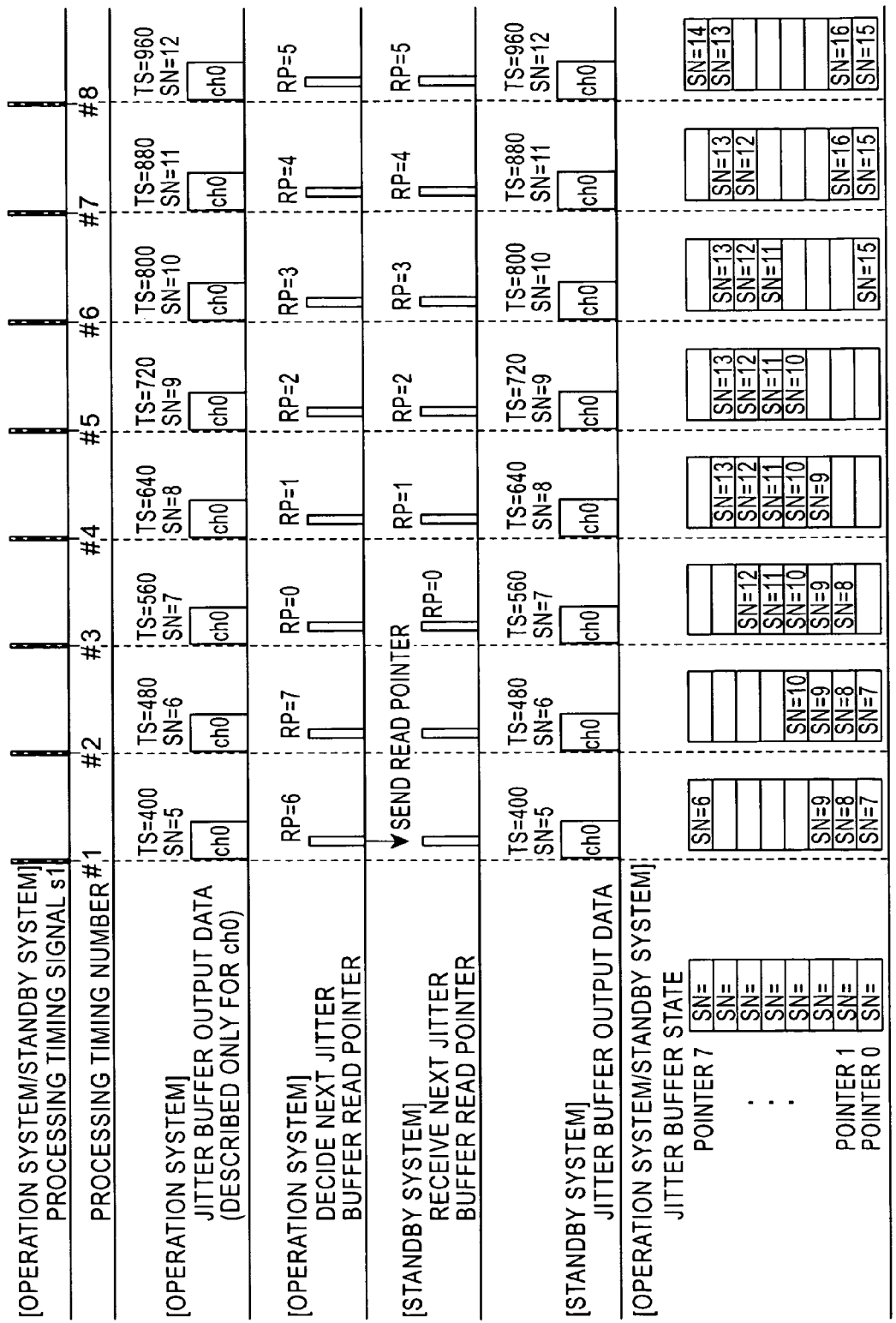
FIG. 6 is a chart showing an outline of a reading operation from a jitter buffer in two systems.

FIG. 6 shows an outline of a reading operation from the jitter buffer 104 and the jitter buffer 204. The jitter buffer 104 and the jitter buffer 204 are caused to operate with a predetermined quantity of packets accumulated that are necessary to absorb arrival fluctuation of packets and packet replacement occurring in the packet network 70. The jitter buffer 104 and the jitter buffer 204 are caused to operate in such a manner that the data read out from them become continuous data strings. Therefore, at the start of speaking, the read pointer RP is decided and operates with spacing from the write pointer WP by an amount equivalent to a pointer value corresponding to the predetermined quantity that should be accumulated in the jitter buffer 104.

Moreover, since data have been written to the jitter buffer 104 and the jitter buffer 204 in such a manner that the data order becomes consecutive as described above, the read pointer in the next processing timing is decided by adding 1 every time data is read out in accordance with the processing timing S1. The read pointer decided in the operation system gateway unit 10 is transferred to the standby system gateway unit 20 at the same time and is decided as the read pointer for the standby system jitter buffer 204. As the read pointer is thus transferred from the operation system gateway unit 10 to the standby system gateway unit 20, the contents of output data of the operation system jitter buffer 104 and the standby system jitter buffer 204 can be made perfectly coincident with each other. Also, as the data is read out from the operation system jitter buffer 104 and the standby system jitter buffer 204 in accordance with the processing timing signal S1, the timing of data output from the jitter buffer 104 in the operation system gateway unit 10 and timing of data output from the jitter buffer 204 in the standby system gateway unit 20 can be perfectly synchronized with each other.

With reference to the bottom of FIG. 6, the state of data accumulation in the operation system jitter buffer 104 and the standby system jitter buffer 204 can be seen. If the processing timing numbers are referred to together with the processing timing numbers in FIG. 5, the state of writing and reading data to and from the operation system jitter buffer 104 and the standby system jitter buffer 204, and the operating state of each pointer can be clarified.

Figure 7:
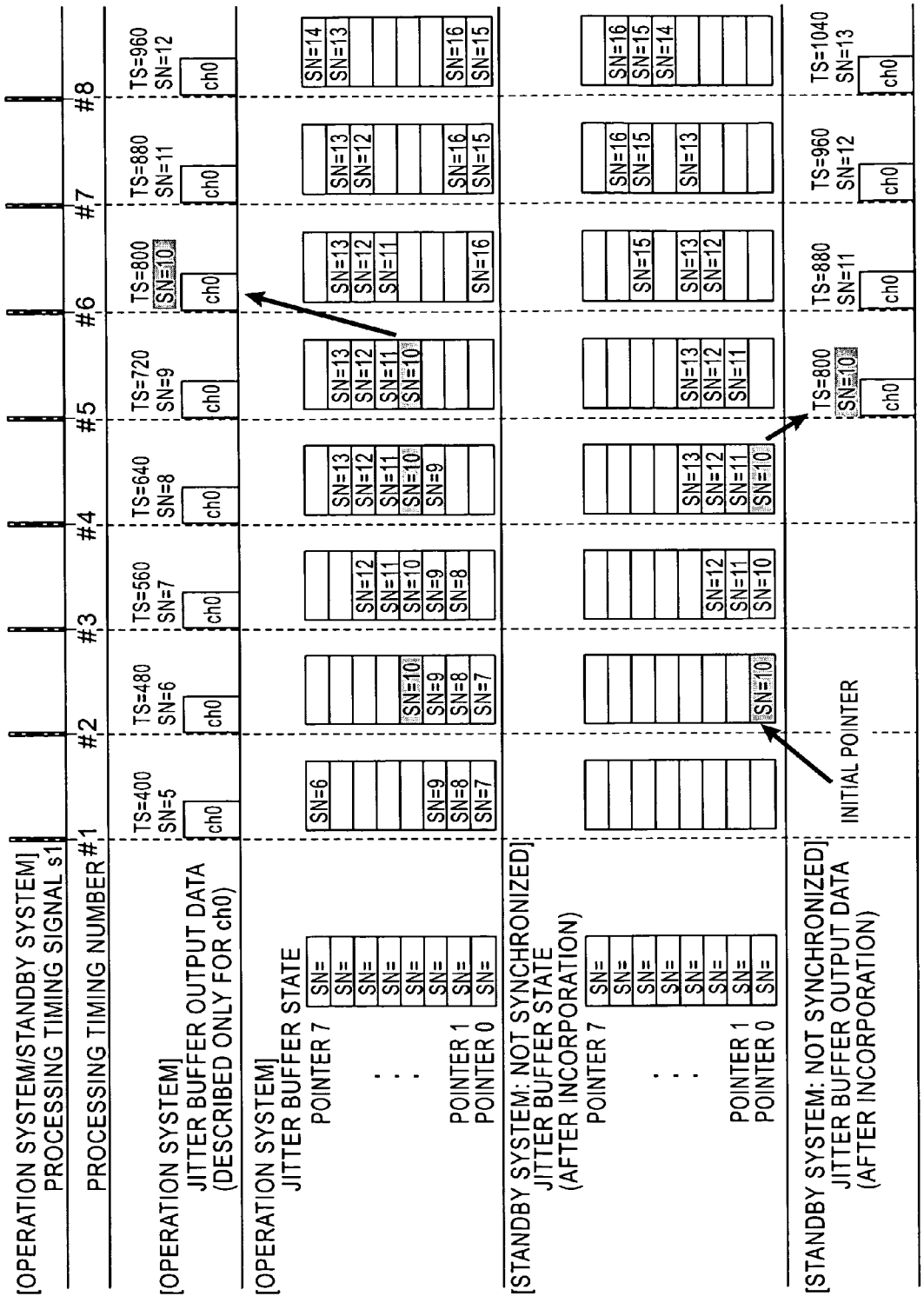
FIG. 7 is a chart showing an operation in the case where a write pointer and a read pointer are not transferred between two systems.

FIG. 7 shows an operation in the case where the write pointer and the read pointer are not transferred between the two systems. Here, it is assumed that a maintenance serviceman incorporates the standby system gateway unit 20 during the operation of the operation system gateway unit 10. The processing timing signal S1, the processing timing numbers, and the timing of input data to the jitter buffer 104 and the jitter buffer 204 are the same as in the above-described cases shown in FIG. 5 and FIG. 6. It is also assumed that the predetermined quantity necessary to absorb arrival fluctuation of packets and packet replacement occurring in the packet network 70 is 4 packets, and that silent data is set as initial data in the jitter buffer 104 and the jitter buffer 204.

First, it is assumed that the standby system gateway unit 20 is incorporated and starts operating in timing of the processing timing number #1. In the standby system gateway unit 20, data (sequence number SN=10) inputted immediately after the processing timing number #1 is written from the initial write pointer WP=0 of the buffer. The subsequently inputted data operates similarly to the above-described writing operation. The data is inputted in a burst between the processing timing numbers #2 and #4. At the time point of the processing timing #4, since the predetermined quantity (4 packets) necessary to absorb arrival fluctuation of packets and packet replacement occurring in the packet network is satisfied, data reading starts at the processing timing number #5.

Meanwhile, in the operation system gateway unit 10, the data (sequence number SN=10) inputted immediately after the processing timing number #1 is written from the write pointer WP=3, which is a halfway point, and its reading starts at the processing timing number #6.

As a result, the output data of the operation system jitter buffer 104 and the output data of the standby system jitter buffer 204 are shifted from each other. If system switching is executed between the operation system gateway unit 10 and the standby system gateway unit 20 in this state, data loss equivalent to one audio processing unit occurs.

Figure 8:
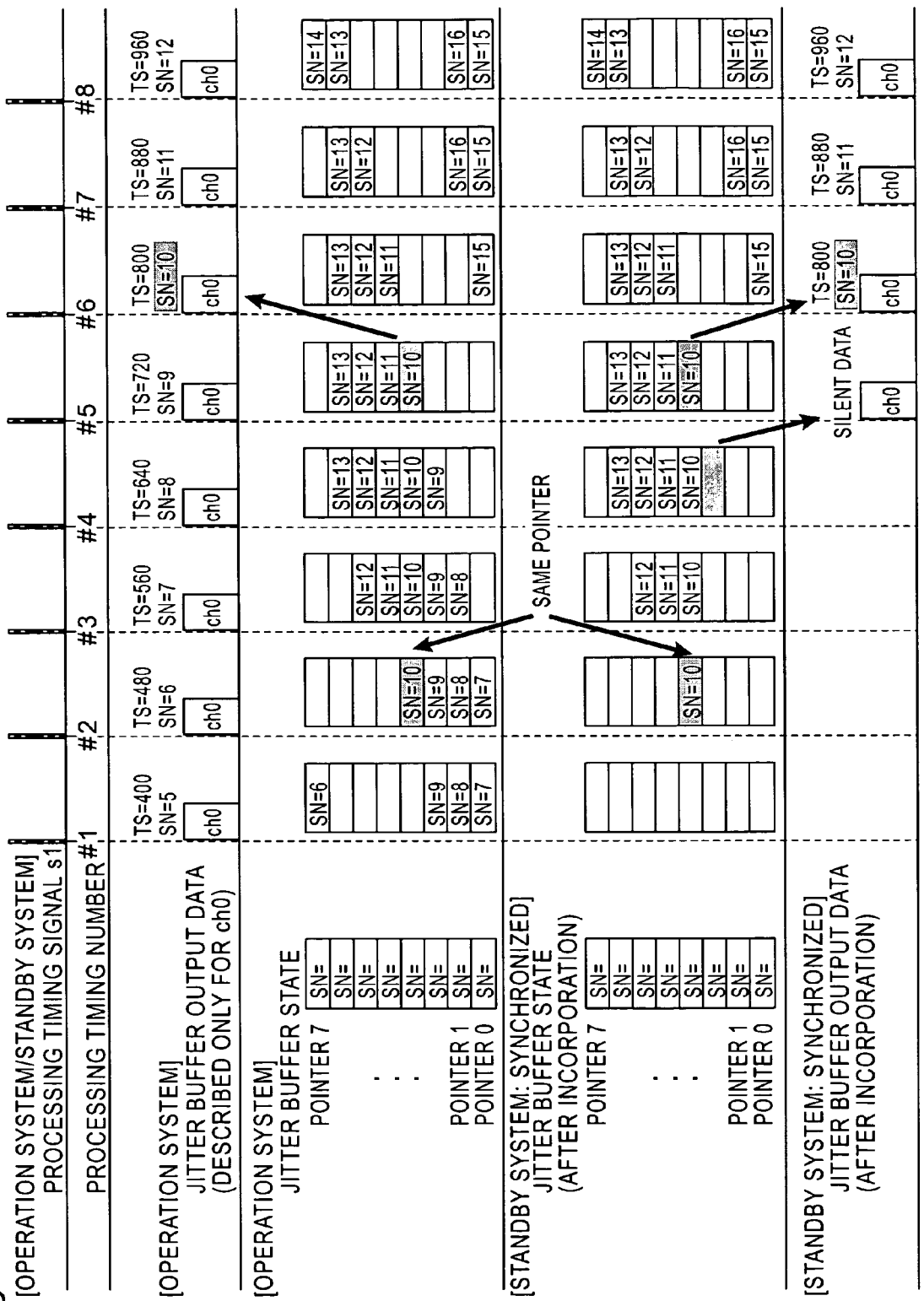
FIG. 8 is a chart showing an operation in the case where a write pointer and a read pointer are transferred between two systems.

FIG. 8 shows an operation in the case where the write pointer and the read pointer are transferred between the two systems. Here, it is assumed that a maintenance serviceman incorporates the standby system gateway unit 20 during the operation of the operation system gateway unit 10. The processing timing signal S1, the processing timing numbers, and the timing of input data to the jitter buffer 104 and the jitter buffer 204 are the same as in the above-described cases shown in FIG. 5, FIG. 6 and FIG. 7.

In the case where the standby system gateway unit 20 is incorporated and starts operating in timing of the processing timing number #1, data (sequence number SN=10) inputted immediately after the processing timing number #1 is written into the buffer from the write pointer WP=3 that is transferred and received from the operation system. The subsequently inputted data operates similarly to the above-described writing operation. The data is inputted in a burst between the processing timing numbers #2 and #4. At the time point of the processing timing #4, since the predetermined quantity necessary to absorb arrival fluctuation of packets and packet replacement occurring in the packet network is satisfied, data reading starts at the processing timing number #5. At this time, the read pointer transferred and received from the operation system gateway unit 10 is RP=2, and silent data, which initial data, is outputted from the standby system jitter buffer 204. The read pointer of the processing timing number #6 is RP=3, and the previously written data with the sequence number SN=10 is read out. Thus, the contents of the output data of the operation system jitter buffer 104 and the standby system jitter buffer 204 perfectly coincide with each other.

Also, the packet network interface unit 40 and the packet network interface unit 41 duplicate the received packet and output the packet of the same content to both the packet selecting unit 100 and the packet selecting unit 200 connected thereto. Thus, in the echo erasing processing by the audio processing unit 105 and the audio processing unit 205, optimum conditions for optimum echo erasing processing for a speaking session are maintained in both the operation system and the standby system.

Description of Effects and Advantages of First Embodiment

In the above-described first embodiment, as the redundancy gateway system according to the invention is used, the series of processing including TDM processing, audio processing, RTP/RTCP processing and IP processing can be carried out in timing based on the frame clock of the TDM signal in both the gateway unit 10 and the gateway unit 20 forming the duplex redundant configuration, and the same packets perfectly synchronized in the two system can be outputted to the packet network 70.

Also, as the time stamp value TS and the sequence number SN are exchanged between the two systems, identity and continuity of these values can be guaranteed. Even in the case where system switching has occurred, the time stamp value TS and the sequence number SN can take consecutive values. In the receiver device of the communication partner via the packet network 70, discontinuity of packets is not detected and the communication is not affected by short interruption.

Moreover, a packet received from the packet network 70 is shared by both the operation system and the standby system. Jitter buffer control is carried out in accordance with the processing timing signal S1 generated by the timing signal generating unit 301, and jitter buffer control is carried out by transferring the write pointer and the read pointer between the operation system jitter buffer 104 and the standby system jitter buffer 204. Thus, the contents of output data of the operation system jitter buffer 104 and the standby system jitter buffer 204 can be made coincident with each other, and their output timing can be synchronized. This enables the same audio data that are perfectly synchronized, to be outputted from the plural gateway units 10 and 20 forming the redundant configuration to the telephone network 60. Therefore, the communication is not affected by short interruption or duplication of audio data when the operation system of the redundancy system is switched.

Also, as optimum conditions for optimum echo erasing processing for a communication session are maintained in both the operation system and the standby system, the time required for setting the echo erasing processing in a state where normal echo erasure is possible, can be omitted and the speaking is not subject to the feeling of abnormality.

Modification of First Embodiment

In the above embodiment, the timing signal generating unit 301, which generates a processing timing signal based on the clock of a TDM signal, is provided in the TDM exchange unit 30 outside of the gateway units 10 and 20. However, such a function may be provided in the gateway unit 10 and/or 20.

In the embodiment, such a processing timing signal is supplied to the gateway units of the two systems from the TDM exchange unit 30. However, a signal that provides processing timing may be incorporated in the TDM signal itself, which is supplied from the TDM exchange unit 30 to the gateway units 10 and 20 of the two systems, thus perfectly synchronizing the series of processing in the two systems.

In the embodiment, the processing timing signal S1 as a reference is generated on the basis of the clock of the TDM signal. However, reference timing having an arbitrary cycle supplied from within or from outside of the gateway units 10 and 20 may be used to perfectly synchronize the series of processing in the two systems.

Also, in the first embodiment, the jitter buffer 104 and the jitter buffer 204 are divided into areas corresponding to each audio processing unit, and a pointer corresponding to the sequence number given to a packet is appended to each area for management, and the write pointer and the read pointer are transferred from the operation system to the standby system to synchronize output data. However, a pointer corresponding to the time stamp given to the packet instead of the sequence number may be appended for management, and the write pointer and the read pointer may be transferred from the operation system to the standby system to synchronize output data.

Moreover, in the above first embodiment, one packet is used as one audio processing unit. However, as another modification of the invention, in the case where an inputted packet has a longer audio packetization cycle (packet length) than the audio processing unit, the audio data may be divided in accordance with the audio processing unit and the divided audio data may be managed by pointer. Alternatively, new identification information may be added to realize synchronization, for example, by newly appending a time stamp value TS to each of the divided audio data and thus realizing synchronization between the two systems, or by newly appending a sequence number SN to each of the divided audio data and thus realizing synchronization. On the other hand, in the case where an inputted packet has a shorter audio packetization cycle (packet length) than the audio processing unit, the audio data may be collectively managed by pointer in accordance with the audio processing unit. Alternatively, new identification information may be appended to realize synchronization, for example, by newly appending a time stamp value TS to each collective audio data and thus realizing synchronization, or by newly appending a sequence number SN to each collective audio data and thus realizing synchronization.

Second Embodiment

Figure 9:
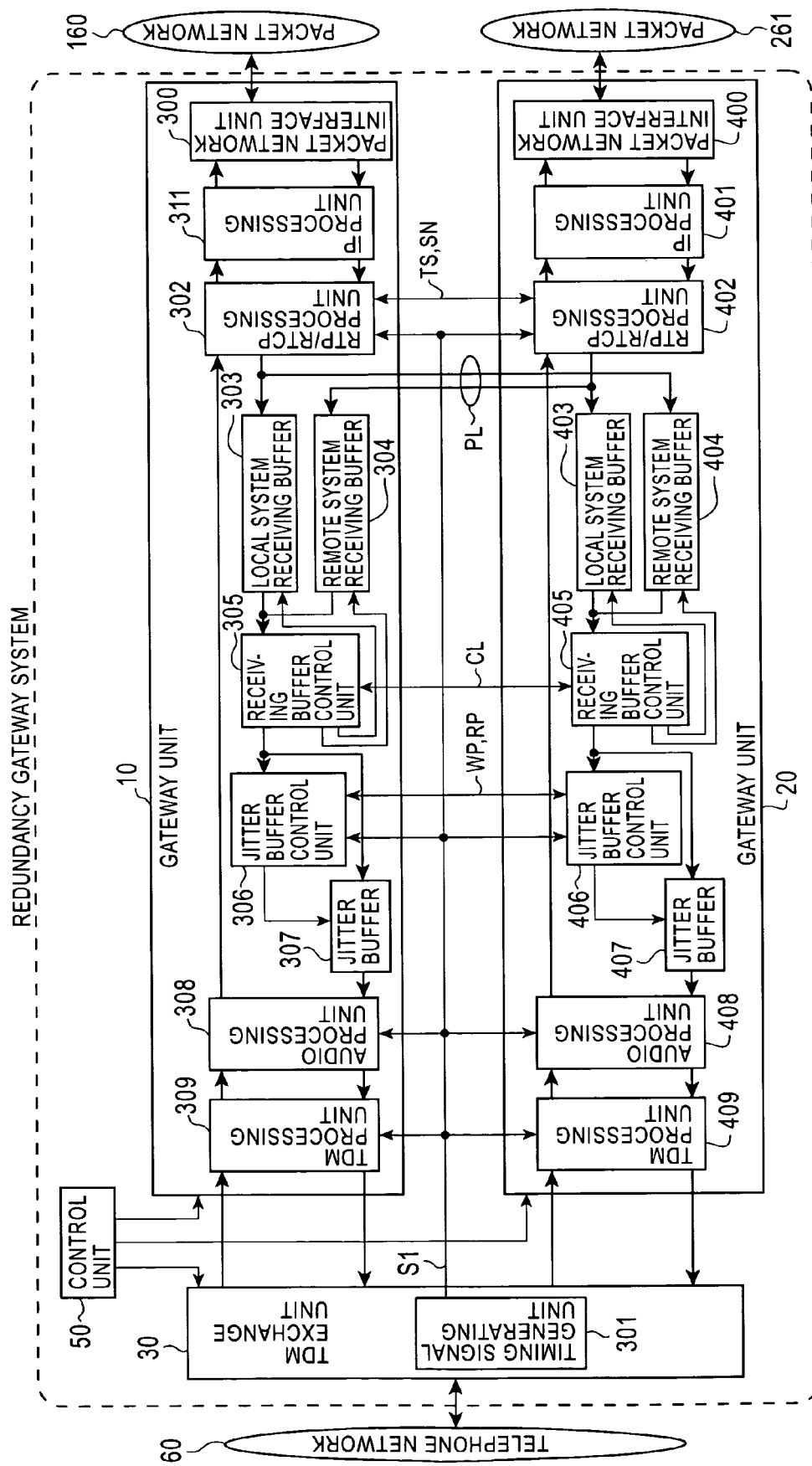
FIG. 9 is a block diagram showing a configuration of a network connected to a redundancy gateway system according to a second embodiment.

FIG. 9 shows a configuration of a redundancy gateway system and a network connected thereto according to a second embodiment. Here, the redundancy gateway system includes at least two gateway units 10 and 20 that are provided between a packet network 160 and a packet network 261 as packet networks forming a redundant configuration including a present-use configuration and a spare configuration, and a telephone network 60 as a TDM network, and that are configured in a multiplex manner to form plural systems. The redundancy gateway system also includes a control unit 50, and a TDM exchange unit 30.

In the second embodiment, the terms "present-use" and "spare" are used instead of "operation system" and "standby system" used in the first embodiment. This is based on the assumption that the two systems including the packet networks and the gateway units are simultaneously operable and that the two systems take an operation form to perform redundant processing of packets of the same contents in different routes and in parallel.

The gateway unit 10 and the gateway unit 20 are connected to the packet network 160 and the packet network 261, which form a present-use configuration and a spare configuration, respectively. The gateway unit 10 sends and receives packets to and from the packet network 160. The gateway unit 20 sends and receives packets to and from the packet network 261. For example, if the packet network 160 is configured for present use and the packet network 261 is configured for spare use as an initial state, the gateway unit 10 is set for present use and the gateway unit 20 is set for spare use.

In the case where a system switch request is made because of system trouble or for maintenance services, the control unit 50 performs a system switching operation by automatic processing based on a command operation or trouble detection from outside. Specifically, the control unit 50 supplies a control signal to the gateway units 10 and 20 and selectively sets each of the gateway units 10 and 20 for present use or for spare use. The control unit 40 also sets packetization information such as packet size and communication destination information in RTP packetization of audio data, and a physical address and IP address necessary for connection to the packet network 160 and the packet network 261, as presetting for the gateway units 10 and 20.

The TDM exchange unit 30 is connected to the telephone network 60 and is constantly connected with the two gateway units 10 and 20 irrespective of the setting for present use or for spare use. However, the TDM exchange unit 30 selects audio data of the present-use gateway unit, which is one of the gateway unit 10 and the gateway unit 20, in accordance with the setting by the control unit 40, and outputs the selected audio data to the telephone network 60. The TDM exchange unit 30 also includes a timing signal generating unit 301, which supplies a common timing signal S1 to the gateway unit 10 and the gateway unit 20.

The gateway unit 10 and the gateway unit 20 have the same internal configuration. The gateway unit 10 includes a packet network interface unit 300, an IP processing unit 311, an RTP/RTCP processing unit 302, a local system receiving buffer 303, a remote system receiving buffer 304, a receiving buffer control unit 305, a jitter buffer control unit 306, a jitter buffer 307, an audio processing unit 308, and a TDM processing unit 309. Similarly, the gateway unit 20 includes a packet network interface unit 400, an IP processing unit 401, an RTP/RTCP processing unit 402, a local system receiving buffer 403, a remote system receiving buffer 404, a receiving buffer control unit 405, a jitter buffer control unit 406, a jitter buffer 407, an audio processing unit 408, and a TDM processing unit 409.

The gateway unit 10 sends and receives packets to and from the packet network 160 through the packet network interface unit 300. The gateway unit 20 sends and receives packets to and from the packet network 261 through the packet network interface unit 400. The gateway units 10 and 20 constantly maintain the communication-enable state to their respective packet networks irrespective of the setting for present use or for spare use.

The packet network interface units 300 and 400 are connected with the IP processing units 311 and 401, respectively. The IP processing units 311 and 401 are connected with the RTP/RTCP processing units 302 and 402, respectively. The RTP/RTCP processing units 302 and 402 have a function of duplicating a local system receiving packet. The RTP/RTCP processing unit 302 is connected with the local system receiving buffer 303 and also connected with the remote system receiving buffer 404 via a receiving packet confounding line PL, and outputs packets of the same contents to both receiving buffers. Similarly, the RTP/RTCP processing unit 402 is connected with the local system receiving buffer 403 and also connected with the remote system receiving buffer 304 via a receiving packet confounding line PL, and outputs packets of the same contents to both receiving buffers. The RTP/RTCP processing units 302 and 402 are also connected with the audio processing units 308 and 408, respectively.

The jitter buffer control units 306 and 406 are connected with each other across the systems, and perform an operation to synchronize the jitter buffer operation by supplying a write pointer WP and a read pointer RP that are commonly used in the redundancy gateway system, from one jitter buffer control unit to the other.

The RTP/RTCP processing units 302 and 402 are connected with each other across the systems, and perform an operation to synchronize RTP/RTCP processing by supplying the time stamp TS and the sequence number SN from one RTP/RTCP processing unit to the other.

The jitter buffers 307 and 407 are connected with the audio processing units 308 and 408. The audio processing units 308 and 408 are connected with the TDM processing units 309 and 409. The TDM processing units 309 and 409 are connected to the TDM exchange unit 30. The control unit 50 is connected with the gateway unit 10 and the gateway unit 20, and with the TDM exchange unit 30. The TDM exchange unit 30 is connected with the telephone network 60.

The IP processing units 311 and 401, the RTP/RTCP processing units 302 and 402, the jitter buffer control units 306 and 406, the jitter buffers 307 and 407, the audio processing units 308 and 408, and the TDM processing units 309 and 409 have the similar functions to those in the first embodiment. These units are supplied with a timing signal S1 from the timing signal generating unit 301 of the TDM exchange unit 30 and perform synchronized operations in audio processing timing in accordance with the timing signal S1. Thus, the jitter buffer operation, and the operations related to synchronization of RTP/RTCP processing and audio processing timing are similar to those in the first embodiment.

The local system receiving buffer 303 and the remote system receiving buffer 304 included in the gateway unit 10 are connected with the receiving buffer control unit 305 and supply audio data from the local system packet network 160 and audio data from the remote system packet network 261 received through the receiving packet confounding line PL. The receiving buffer control unit 305 is also connected with the local system receiving buffer 303 and the remote system receiving buffer 304 in order to control writing and reading.

The local system receiving buffer 403 and the remote system receiving buffer 404 included in the gateway unit 20 are connected with the receiving buffer control unit 405 and supply audio data from the local system packet network 261 and audio data from the remote system packet network 160 received through the receiving packet confounding line PL. Also, the receiving buffer control unit 405 is connected with the local system receiving buffer 403 and the remote system receiving buffer 404, and controls writing to and reading from these buffers. The receiving buffer control units 305 and 405 are connected with the jitter buffer control units 306 and 406, respectively and with the jitter buffers 307 and 407, respectively and supply audio data received by them. The receiving buffer control unit 305 and the receiving buffer control unit 405 are connected with each other via a receiving buffer control signal line CL across the systems, and perform synchronization of the local system receiving buffers 303 and 403 and the remote system receiving buffers 304 and 404 by supplying a buffer pointer BP from one receiving buffer control unit to the other.

FIG. 10 to FIG. 13 show operations of the redundancy gateway system according to the second embodiment, in the form of time charts with the horizontal axis representing time. The operations of the redundancy gateway system will be described hereinafter, properly referring to FIG. 10 to FIG. 13 and the component elements shown in the block diagram of FIG. 9.

It is assumed that the redundancy gateway system receives the same packet from the packet network 160 and the packet network 261 in parallel, then converts the packet to audio data in the form of TDM signal and outputs it to the telephone network 60.

The packet network interface units 300 and 400 receive packets from the packet network 160 and the packet network 261, receive only a packet with a local system physical address that is preset by the control unit 50, and supply the received packet to the IP processing units 311 and 401. The IP processing-units 311 and 401 receive only a packet with a local system IP address that is preset by the control unit 50, of the supplied packets, then confirm normality of header information and data in accordance with the need, and supply only a valid packet to the RTP/RTCP processing units 302 and 402.

The RTP/RTCP processing units 302 and 402 extract packet discrimination information from the supplied packet, that is, information such as port number, sequence number, time stamp, and synchronization source identifier (SSRC), and combine these with the audio data of the payload part to generate audio data. Moreover, the RTP/RTCP processing unit 302 supplies the generated audio data to the local system receiving buffer 303 and also supplies the audio data to the remote system receiving buffer 404 via the receiving packet confounding line PL. Similarly, the RTP/RTCP processing unit 402 supplies the generated audio data to the local system receiving buffer 403 and also supplies the audio data to the remote system receiving buffer 304 connected via the receiving packet confounding line PL.

Writing Operation to Receiving Buffer

Figure 10:
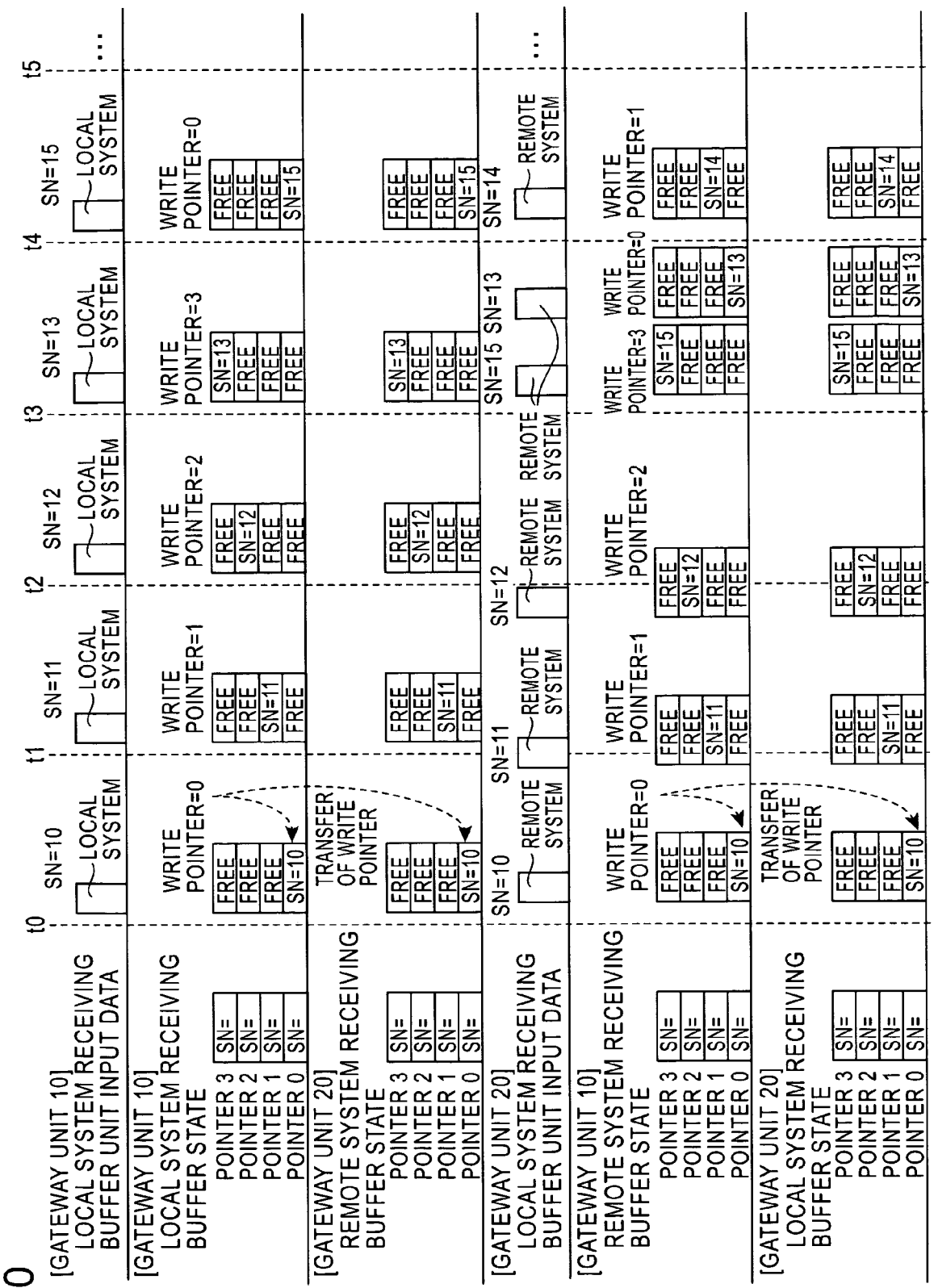
FIG. 10 is a time chart showing a writing operation to a local-system receiving buffer and a remote-system receiving buffer.

FIG. 10 shows a writing operation to the local system receiving buffers 303 and 403 and the remote system receiving buffers 304 and 404 by the receiving buffer control units 305 and 405. Here, each of the local system receiving buffers 303 and 403, the remote system receiving buffers 304 and 404, and the receiving buffer control units 305 and 405, has a four-side memory configuration with individual pointers appointed thereto. The actual memory configuration should be decided by network conditions and so on.

First, in timing t0, audio data (SN=10) inputted from the RTP/RTCP processing unit 302 to the local system receiving buffer 303 in the present-use gateway unit 10 is written to a pointer 0 in the local system receiving buffer 303 in accordance with write pointer management by the receiving buffer control unit 305. Meanwhile, the same audio data (SN=10) is inputted from the RTP/RTCP processing unit 302 to the remote system receiving buffer 404 via the receiving packet confounding line PL. At the same time, the write pointer of the local system receiving buffer 303 is transferred from the present-use gateway unit 10 to the spare gateway unit 20. In response to this, the audio data (SN=10) is written to a pointer 0 in the remote system receiving buffer 404 of the spare gateway unit 20 in accordance with write pointer management by the receiving buffer control unit 405 of the spare gateway unit 20.

Next, in timing t1, audio data (SN=11) inputted to the local system receiving buffer 303 is similarly written to a pointer 1 in the local system receiving buffer 303. The same audio data (SN=11) inputted to the remote system receiving buffer 404 is similarly written to a pointer 1 in the remote system receiving buffer 404. Subsequently, the similar operation is carried out and the same audio data is written to the same pointer in the local system receiving buffer 303 and the remote system receiving buffer 404.

Meanwhile, in parallel to the above operation, in timing t0, the audio data (SN=10) inputted from the RTP/RTCP processing unit 402 of the spare gateway unit 20 is supplied to the local system receiving buffer 403 and also supplied to the remote system receiving buffer 304 via the receiving packet confounding line PL. The audio data (SN=10) supplied to the local system receiving buffer 403 is written to a pointer 0 in the local system receiving buffer 403 in accordance with write pointer management by the receiving buffer control unit 405 of the spare gateway unit 20. The audio data (SN=10) supplied to the remote system receiving buffer 304 is written to a pointer 0 in the remote system receiving buffer 304 in accordance with write pointer management by the receiving buffer control unit 305 of the present-use gateway unit 10. Subsequently, the similar operation is carried out as in the operation with respect to the audio data inputted from the RTP/RTCP processing unit 302 of the present-use gateway unit 10.

However, in the second embodiment, each write pointer is transferred from the present-use gateway unit 10 to the spare gateway unit 20, thus realizing uniformity of the operation management. That is, the receiving buffer control unit 305 of the present-use gateway unit 10 decides and controls, on its own, the write pointer in the local system receiving buffer 303 and the remote system receiving buffer 304. On the other hand, the receiving buffer control unit 405 of the spare gateway unit 20 controls the write pointer in the local system receiving buffer 403 and the remote system receiving buffer 404 in accordance with the write pointer transferred from the present-use gateway unit 10.

Reading Operation from Receiving Buffer

Figure 11:
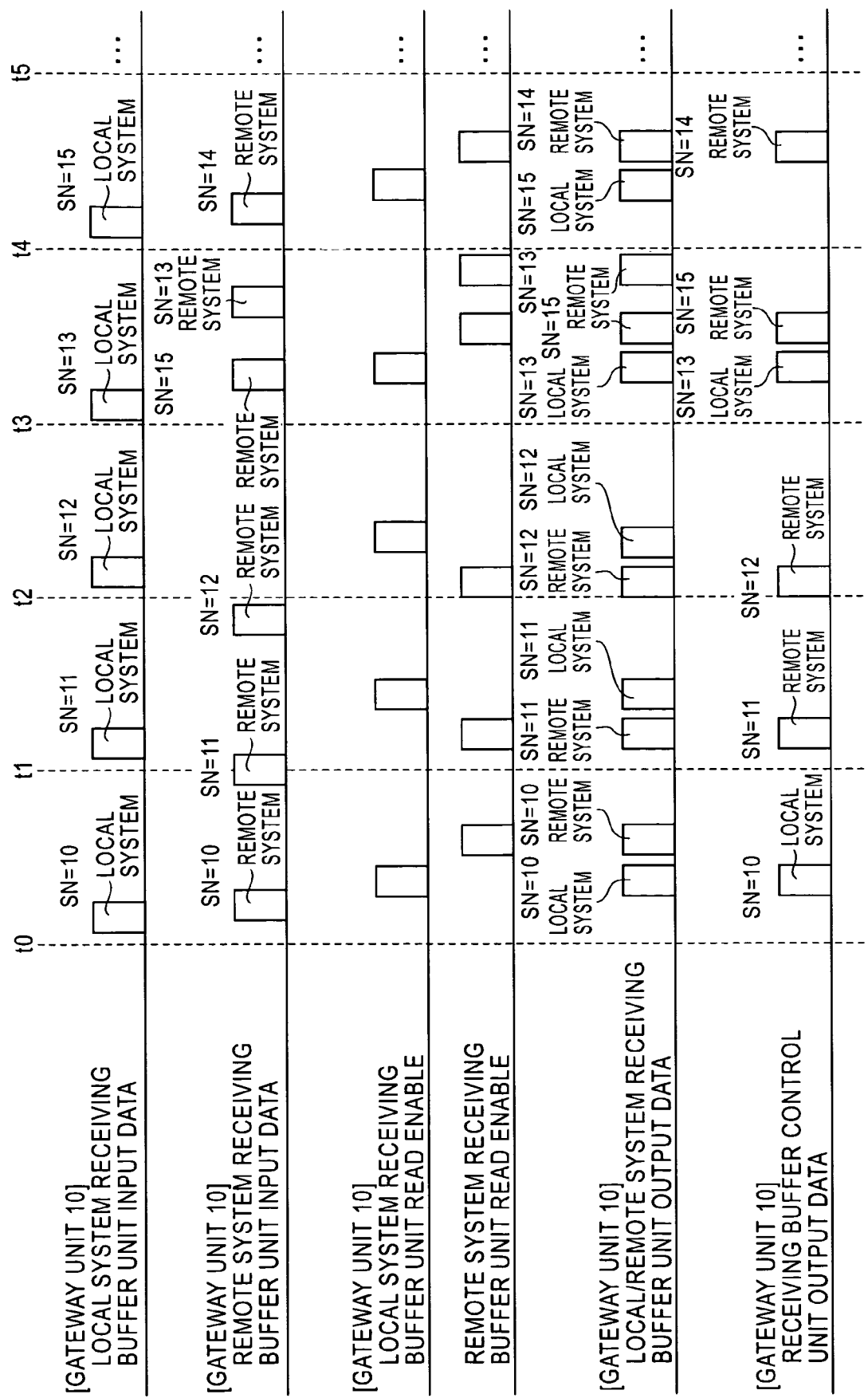
FIG. 11 is a time chart showing a reading operation from a local-system receiving buffer and a remote-system receiving buffer of a present gateway unit.

FIG. 11 shows a reading operation from the local system receiving buffer 303 and the remote system receiving buffer 304 of the present-use gateway unit 10 by the receiving buffer control unit 305. Here, the receiving buffer control unit 305 constantly monitors whether each of the local system receiving buffer 303 and the remote system receiving buffer 304 holds audio data or not. If they hold audio data, they are controlled to perform a reading operation each time. The reading target buffer and the read pointer are centrally decided by the receiving buffer control unit 305 of the present-use gateway unit 10. Also, the reading operation from the receiving buffers is controlled by the receiving buffer control unit 305 using a read enable signal so that reading is not simultaneously carried out from both the local system receiving buffer 303 and the remote system receiving buffer 304. In the middle stage in FIG. 11, read enable signals to the local system receiving buffer 303 and the remote system receiving buffer 304 and audio data strings to be outputted are shown.

First, immediately after timing t0, and after writing of the audio data (SN=10) inputted to the local system receiving buffer 303, into the local system receiving buffer 303, is completed, it is detected by the receiving buffer control unit 305 that the audio data is held in the local system receiving buffer 303. The audio data is read out from the local system receiving buffer 303 and supplied to the receiving buffer control unit 305. After that, also the audio data (SN=10) inputted the remote system receiving buffer 304 is similarly read out from the remote system receiving buffer 304 and supplied to the receiving buffer control unit 305. Here, the audio data supplied to the receiving buffer control unit 305 is supplied from both the packet network 160 and the packet network 261. Therefore, processing with a data rate that is twice higher is necessary. In the actual circuit, the circuit configuration that multiplies the data bus is employed to improve the processing rate.

The receiving buffer control unit 305 extracts packet discrimination information from the supplied audio data, that is, information such as port number, sequence number, time stamp, and synchronization source identifier (SSRC), and determines whether the audio data is the same as the audio data that has been supplied in advance. If it is determined that the audio data is the same as the audio data that has been supplied in advance, the audio data is discarded as duplicate audio data. Here, the audio data supplied in advance that is necessary for such determination, of the audio data received in the past, is the audio data received at a time preceding the present time point by at least "$\alpha+\beta$+maximum delay time in buffer reading", where the arrival fluctuation time in the packet network 160 is $\pm\alpha$ hours and the arrival fluctuation time in the packet network 261 is $\pm\beta$ hours.

In the bottom of FIG. 11, audio data outputted as the result of the above-described discard processing in the receiving buffer control unit 305 is shown. Only the audio data read out first from the local system receiving buffer 303 or the remote system receiving buffer 304 is supplied to the jitter buffer 307 and the jitter buffer control unit 306 on the subsequent stage as a valid audio data.

In FIG. 11, the operation of the present-use gateway unit 10 is described. Also the operation of the spare gateway unit 20 is carried out basically in a similar manner. However, in reading from the local system receiving buffer 403 and the remote system receiving buffer 404 in the spare gateway unit 20, the reading target buffer and the read pointer decided by the receiving buffer control unit 305 with respect to the local system receiving buffer 303 and the remote system receiving buffer 304 in the above-described present-use gateway unit 10 are sent to the receiving buffer control unit 405 via the receiving buffer control signal line CL. As the receiving buffer control unit 405 receives the reading target buffer and the read pointer, the receiving buffer control unit 405 controls the reading operation from the remote system receiving buffer 404 and the local system receiving buffer 403 synchronously with the reading operation in the present-use gateway unit 10. In this case, reading from the remote system receiving buffer 404 is carried out after the read pointer in the local system receiving buffer 303 of the present-use gateway unit 10 is substituted for the read pointer in the remote system receiving buffer 404 of the spare gateway unit 20. Reading from the local system receiving buffer 403 is carried out after the read pointer in the remote system receiving buffer 304 of the present-use gateway unit 10 is substituted for the read pointer in the local system receiving buffer 403 of the spare gateway unit 20. By the above operation, the same audio data that are perfectly synchronized are supplied to the jitter buffer control unit 306 and the jitter buffer 307 in the present-use gateway unit 10, and to the jitter buffer control unit 406 and the jitter buffer 407 in the spare gateway unit 20.

Figure 12:
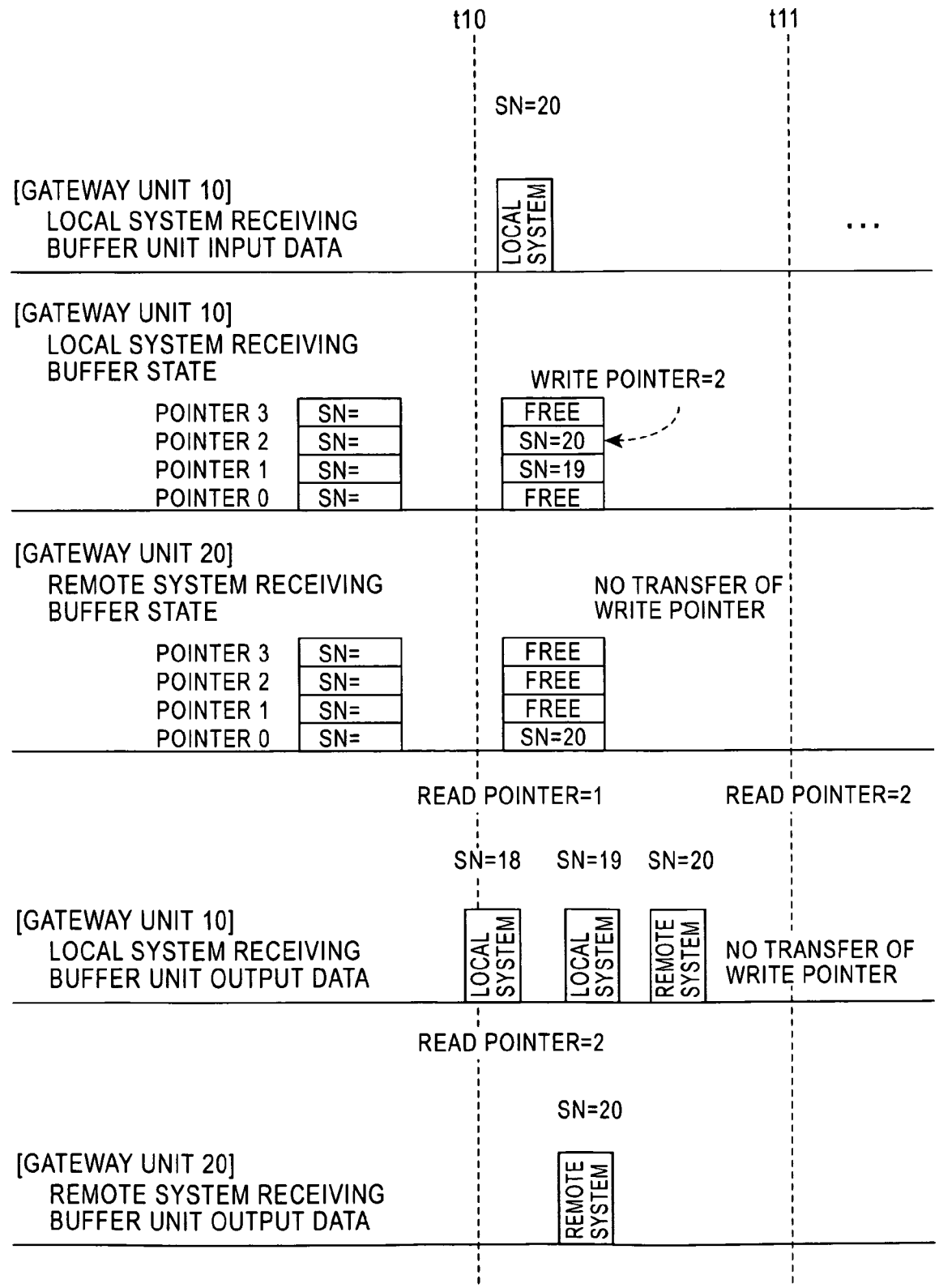
FIG. 12 is a time chart showing an operation in the case where a write/read pointer for a receiving buffer is "not transferred" when a spare gateway unit is newly incorporated.

FIG. 12 shows an operation in the case where the write/read pointer of the receiving buffer is "not transferred" through the receiving buffer control signal line CL when the spare gateway unit 20 is newly incorporated during the operation of the present-use gateway unit 10. Here, it is assumed that the spare gateway unit 20 is incorporated in the state where audio data (SN=19) that is not read out is held in the local system receiving buffer 303 of the present-use gateway unit 10.

First, immediately after timing t10, inputted audio data (SN=20) is written to a pointer 2 in the local system receiving buffer 303 of the present-use gateway unit 10. Similarly, the audio data (SN=20) is also inputted via the receiving packet confounding line PL to the remote system receiving buffer 404 of the spare gateway unit 20, which has been incorporated before, and the audio data is written to an initial pointer 0.

After writing of the audio data (SN=20) is completed, in the case where audio data is to be read out from the local system receiving buffer 303 and the remote system receiving buffer 404, the audio data (SN=19) held in the local system receiving buffer 303 is read out first in the present-use gateway unit 10. On the other hand, in the spare gateway unit 20, the audio data (SN=20) is read out. That is, the same audio data that are perfectly synchronized are not supplied to the jitter buffer control unit 306 and the jitter buffer 307 in the present-use gateway unit 10, and to the jitter buffer control unit 406 and the jitter buffer 407 in the spare gateway unit 20. As a result, synchronization of the jitter buffers described in the first embodiment cannot be realized.

Figure 13:
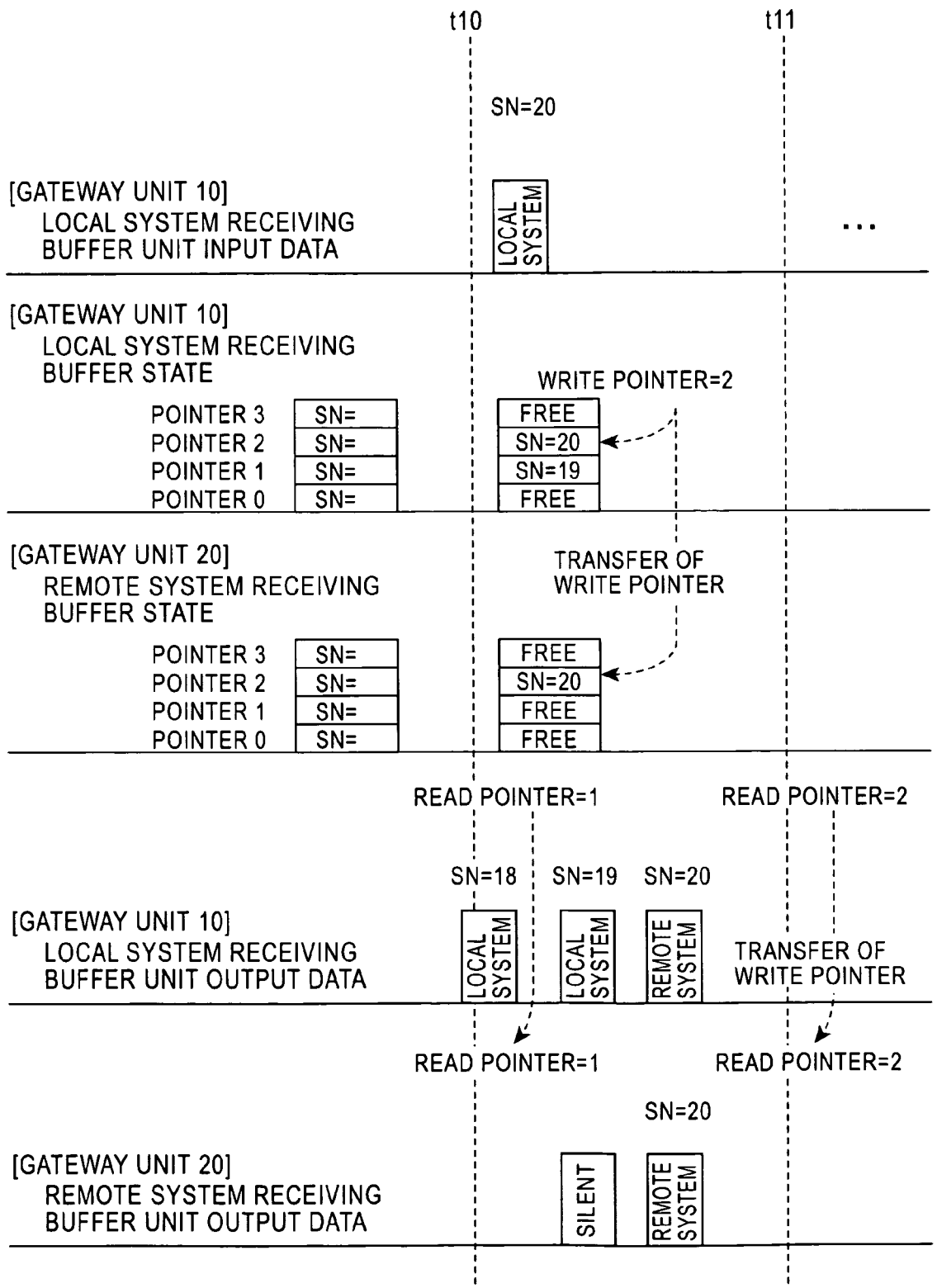
FIG. 13 is a time chart showing an operation in the case where a write/read pointer for a receiving buffer is "transferred" when a spare gateway unit is newly incorporated.

FIG. 13 shows an operation in the case where the write/read pointer of the receiving buffer is "transferred" through the receiving buffer control signal line when the spare gateway unit 20 is newly incorporated during the operation of the present-use gateway unit 10. Here, as in the case of FIG. 12, it is assumed that the spare gateway unit 20 is incorporated in the state where the audio data (SN=19) that is not read out is held in the local system receiving buffer 303 of the present-use gateway unit 10.

First, immediately after timing t10, inputted audio data (SN=20) is written to a pointer 2 in the local system receiving buffer 303 of the present-use gateway unit 10. Similarly, the inputted audio data (SN=20) is written via the receiving packet confounding line PL to a pointer 2 in the remote system receiving buffer 404 of the spare gateway unit 20, which has been incorporated before, in accordance with the write pointer value 2 inputted via the receiving buffer control signal line CL.

After writing of the audio data (SN=20) is completed, in the case where audio data is to be read from the local system receiving buffer 303 and the remote system receiving buffer 404, the audio data (SN=19) held in the local system receiving buffer 303 is read out first in the present-use gateway unit 10. On the other hand, in the spare gateway unit 20, a free area of pointer 1 is read out in accordance with the read pointer value 1 transferred thereto. However, the output data where no audio data is written is made silent data, thereby supplying data having no influence on the audio processing unit 408 on the subsequent stage.

Next, in the case where the audio data (SN=20) is read out from the local system receiving buffer 303, the audio data (SN=20) is also read out from the remote system receiving buffer 404. That is, the same audio data that are perfectly synchronized are supplied to the jitter buffer control unit 306 and the jitter buffer 307 in the present-use gateway unit 10 and to the jitter buffer control unit 406 and the jitter buffer 407 in the spare gateway unit 20. As a result, as described in the first embodiment, the jitter buffer control units 306 and 406 that control the jitter buffer 307 and the jitter buffer 407, respectively, the audio processing units 308 and 408, and the TDM processing units 309 and 409 can perform processing perfectly synchronously in accordance with the reference timing signal s1.

Description of Effects and Advantages of Second Embodiment

In the above second embodiment, the gateway units 10 and 20 form a communication-enable state to the packet network 160 and the packet network 261 of the redundant configuration, partly in place of the configuration described in the first embodiment. Each of the gateway units 10 and 20 extracts and commonly holds a series of valid packets that are not duplicate, from all the packets including the packets received by the remote system.

In the configuration of the first embodiment, in the case where the packet network 160 and the packet network 261 form the redundant configuration and system switching is carried out between them, there still is a difference in timing between such system switching and system switching between gateway units forming a redundant configuration, and loss of a packet or packets cannot be avoided. On the other hand, in the configuration of the second embodiment, even in system switching including the packet network 160 and the packet network 261 forming the redundant configuration, loss of receiving packets does not occur and system switching can be carried out without any short interruption.

Also, since each of the gateway units 10 and 20 extracts and commonly holds a series of valid packets from all the packets including the packets received by the remote system, system switching between the packet network 160 and the packet network 261 forming the redundant configuration, and system switching between the gateway units 10 and 20 forming the redundant configuration can be separately carried out. Therefore, system switching can be easily carried out without using a special network switching device and without causing any short interruption. Such effects not only improve the maintenance property of the gateway units but also significantly improve the maintenance property of the packet networks because the gateway units need not be aware of the present use or spare use of the packet networks.

Modification of Second Embodiment

In the above second embodiment, the receiving buffer control unit 305 extracts packet discrimination information, that is, information such as port number, sequence number, time stamp, and synchronization source identifier (SSRC), from the audio data supplied from the receiving buffer, and determines whether the audio data is the same as the audio data that has been supplied before. If it is determined that it is the audio data that has been inputted before, the audio data is discarded as duplicate audio data. However, such functions may be provided in the jitter buffer control units 306 and 406.

The jitter buffer control units 306 and 406 may extract packet discrimination information, that is, information such as port number, sequence number, time stamp, and synchronization source identifier (SSRC), from the audio data supplied from the receiving buffer, and determine whether the audio data is the same as the audio data that has been supplied before and written to the jitter buffers. If it is determined that it is the audio data that has been written to the jitter buffers, the jitter buffer control units 306 and 406 may determine the audio data to be duplicate audio data and control the write enable signal of the jitter buffers into a non-write state.

In the above embodiments, the gateway units that house a telephone unit and perform audio processing are described as an example. However, the invention is broadly applicable to cases where system switching without short interruption is necessary in a redundancy gateway system that carries out data communications using not only audio but also a packet network.

Also, in the above embodiments, the communication form in which transfer is carried out on the IP protocol is described as an example. However, the invention is applicable not only to cases where the IP protocol is used as the transfer protocol, but also to cases where other packet protocols such as ATM (Asynchronous Transfer Mode) and FR (Frame Relay) are used.

Moreover, in the above embodiments, one audio channel is described. However, the redundancy gateway system according to the invention is also applicable to gateway units that process plural channels.

This application is based on Japanese Patent Applications Nos. 2006-342458 and 2007-197425 which are hereby incorporated by reference.

What is claimed is:

1. A redundancy gateway system, including a plurality of gateway units, configured in a multiplex manner between a packet network and a Time Division Multiplexing (TDM) network, and which performs TDM conversion processing to a plurality of packets supplied from the packet network, by the gateway units, and supplies a resulting TDM signal to the TDM network, the redundancy gateway system comprising:
   a same packet supply unit that generates a duplicate of the packet and thus supplies packets of the same content to the plurality of gateway units;
   a common write pointer generating unit that generates, for each of the packets, a common write pointer corresponding to identification information appended to the packet; and
   a selective supply unit that selectively switches one of the plurality of gateway units and supplies only a TDM signal acquired from the one gateway unit to the TDM network;
   wherein each of the plurality of gateway units includes
      at least one jitter buffer,
      a unit that generates a read pointer for the jitter buffer, and
      a jitter buffer control unit that writes, for each supplied packet, the packet into the jitter buffer in accordance with the common write pointer corresponding to the packet, and sequentially reads out a written packet from the jitter buffer in accordance with the jitter buffer read pointer and provides it for the TDM conversion processing;
   wherein the common write pointer generating unit and the read pointer generating unit are provided in each of the plurality of gateway units; and
   wherein only one gateway unit, corresponding to an operation command generates the write pointer and the read pointer and commonly supplies them to all the gateway units.

2. A redundancy gateway system that includes a plurality of gateway units configured in a multiplex manner between a packet network and a TDM network, and which performs a Time Division Multiplexing (TDM) conversion processing to a plurality of packets supplied from the packet network, by the gateway units, and supplies a resulting TDM signal to the TDM network, the redundancy gateway system comprising:
   a same packet supply unit that generates a duplicate of the packet and thus supplies packets of the same content to the plurality of gateway units;
   a common write pointer generating unit that generates, for each of the packets, a common write pointer corresponding to identification information appended to the packet; and
   a selective supply unit that selectively switches one of the plurality of gateway units and supplies only a TDM signal acquired from the one gateway unit to the TDM network;
   wherein each of the plurality of gateway units includes
      at least one jitter buffer,
      a unit that generates a read pointer for the jitter buffer, and
      a jitter buffer control unit that writes, for each supplied packet, the packet into the jitter buffer in accordance with the common write pointer corresponding to the packet, and sequentially reads out a written packet from the jitter buffer in accordance with the jitter buffer read pointer and provides it for the TDM conversion processing;
   further comprising a processing timing signal generating unit that generates a common processing timing signal with a predetermined cycle, wherein all the plurality of gateway units carry out writing and reading operations to and from their own jitter buffers that they have, synchronously with the common processing timing signal;
   wherein the common write pointer generating unit and the read pointer generating unit are provided in each of the plurality of gateway units; and
   wherein only one gateway unit corresponding to an operation command generates the write pointer and the read pointer and commonly supplies them to all the gateway units.

3. A redundancy gateway system which includes a plurality of gateway units configured in a multiplex manner between a plurality of packet networks configured in a multiplex manner and a Time Division Multiplexing (TDM) network, and which performs TDM conversion processing to a plurality of packets supplied from the packet networks, by the gateway units, and supplies a resulting TDM signal to the TDM network, the redundancy gateway system comprising:
   a common write pointer generating unit that generates, for each of the packets, a common write pointer corresponding to identification information appended to the packet; and
   a selective supply unit that selectively switches one of the plurality of gateway units and supplies only a TDM signal acquired from the one gateway unit to the TDM network;
   wherein each of the plurality of gateway units includes
      at least one receiving buffer,
      at least one jitter buffer,
      a unit that generates a read pointer for the jitter buffer,
      a same packet supply unit that takes in a packet supplied only from one of the packet networks, duplicates this packet to generate a packet of a same content, and supplies it to another gateway unit different from a local gateway unit,
      a receiving buffer control unit that sequentially writes and reads both a packet taken in by the local gateway unit and a packet supplied from another gateway unit different from the local gateway unit into and from the receiving buffer,
      a valid packet supply unit that uses a packet read out first from the receiving buffer as a valid packet and discards a packet of the same content read out later in duplicate as an invalid packet, thereby supplying only the valid packet to the jitter buffer, and
      a jitter buffer control unit that writes, for each packet supplied by the valid packet supply unit, the packet into the jitter buffer in accordance with the common write pointer corresponding to the packet, and sequentially reads out a written packet from the jitter buffer in accordance with the jitter buffer read pointer and provides it for the TDM conversion processing.

4. The redundancy gateway system according to claim 3, further comprising a processing timing signal generating unit that generates a common processing timing signal with a predetermined cycle, wherein all the plurality of gateway units carry out writing and reading operations to and from their own jitter buffers that they have, synchronously with the common processing timing signal.

5. The redundancy gateway system according to claim 4, wherein the processing timing signal generating unit generates a common processing timing signal with a cycle synchronized with the TDM signal as the predetermined cycle.

6. The redundancy gateway system according to claim 3, wherein the common write pointer generating unit and the unit that generates the read pointer are provided in each of the plurality of gateway units, and only one gateway unit corresponding to an operation command generates the write pointer and the read pointer and commonly supplies them to all the gateway units.

7. The redundancy gateway system according to claim 4, wherein the common write pointer generating unit and the unit that generates the read pointer are provided in each of the plurality of gateway units, and only one gateway unit corresponding to an operation command generates the write pointer and the read pointer and commonly supplies them to all the gateway units.

8. The redundancy gateway system according to claim 3, wherein each of the gateway units includes a unit that generates a write pointer and a read pointer for the receiving buffer for each of the packets, and only one gateway unit corresponding to an operation command generates the write pointer and the read pointer for the receiving buffer and commonly supplies them to all the gateway units, and the receiving buffer control units of all the gateway units control writing or reading of a packet to or from a control target receiving buffer in accordance with the write pointer and the read pointer supplied thereto.

9. The redundancy gateway system according to claim 4, wherein each of the gateway units includes a unit that generates a write pointer and a read pointer for the receiving buffer for each of the packets, and only one gateway unit corresponding to an operation command generates the write pointer and the read pointer for the receiving buffer and commonly supplies them to all the gateway units, and the receiving buffer control units of all the gateway units control writing or reading of a packet to or from a control target receiving buffer in accordance with the write pointer and the read pointer supplied thereto.

* * * * *